(12) United States Patent
Holler et al.

(10) Patent No.: US 9,690,461 B2
(45) Date of Patent: Jun. 27, 2017

(54) INTEGRATED PLANNING ENVIRONMENT FOR AGILE SOFTWARE DEVELOPMENT

(71) Applicant: VersionOne, Inc., Alpharetta, GA (US)

(72) Inventors: Robert Holler, Cumming, GA (US); Ian Culling, Cumming, GA (US); Rajiv Delwadia, Woodstock, GA (US); Pavel Mamut, Buford, GA (US); Mark Crowe, Kula, HI (US); Donald Hanson, Cumming, GA (US); Patrick Boudreaux, Cumming, GA (US)

(73) Assignee: VERSIONONE, INC., Alpharetta, GA (US)

( * ) Notice: Subject to any disclaimer, the term of this patent is extended or adjusted under 35 U.S.C. 154(b) by 0 days.

(21) Appl. No.: 14/288,317

(22) Filed: May 27, 2014

(65) Prior Publication Data

US 2014/0331172 A1 Nov. 6, 2014

Related U.S. Application Data

(63) Continuation of application No. 12/016,191, filed on Jan. 17, 2008, now Pat. No. 8,739,047.

(51) Int. Cl.
*G06F 3/048* (2013.01)
*G06F 3/0484* (2013.01)
*G06Q 10/06* (2012.01)
*G06F 9/44* (2006.01)

(52) U.S. Cl.
CPC ............ *G06F 3/04842* (2013.01); *G06F 8/34* (2013.01); *G06Q 10/0631* (2013.01)

(58) Field of Classification Search
CPC .................................................... G06F 3/0481

USPC ........................................................ 715/733
See application file for complete search history.

(56) References Cited

U.S. PATENT DOCUMENTS

| 5,544,300 A | 8/1996 | Skarbo et al. |
| 5,714,971 A | 2/1998 | Shalit et al. |
| 5,874,958 A | 2/1999 | Ludolph |
| 5,943,053 A | 8/1999 | Ludolph et al. |

(Continued)

OTHER PUBLICATIONS

Holler, Office Action, U.S. Appl. No. 14/054,733, Oct. 24, 2014, 11 pgs.

(Continued)

*Primary Examiner* — Matthew Ell
(74) *Attorney, Agent, or Firm* — Morgan, Lewis & Bockius LLP

(57) ABSTRACT

Systems and method for presenting and enabling editing of project management data for agile software development are provided. In some implementations, a method includes, in a software development application: identifying a first plurality of assets associated with a software product being developed in the software development application in a first content display window; responsive to detecting a user selection of a first link corresponding to a first asset in the first plurality of assets: displaying, in the first content display window, a second plurality of assets associated with the first asset; and responsive to detecting a selection of a second link corresponding to a second asset in the second plurality of assets: displaying in a second content display window separate and distinct from the first content display window, attributes of the second asset configured to be editable by a user.

2 Claims, 24 Drawing Sheets

(56) References Cited

U.S. PATENT DOCUMENTS

| | | | |
|---|---|---|---|
| 5,956,030 A | 9/1999 | Conrad et al. | |
| 6,175,364 B1 | 1/2001 | Wong et al. | |
| 6,211,874 B1* | 4/2001 | Himmel | G06F 17/30905 707/E17.121 |
| 6,239,798 B1 | 5/2001 | Ludolph et al. | |
| 6,694,009 B1 | 2/2004 | Anderson et al. | |
| 6,698,013 B1 | 2/2004 | Bertero et al. | |
| 6,850,255 B2 | 2/2005 | Muschetto | |
| 7,051,038 B1 | 5/2006 | Yeh et al. | |
| 7,117,447 B2 | 10/2006 | Cobb et al. | |
| 7,210,093 B1 | 4/2007 | Dutta | |
| 7,236,966 B1 | 6/2007 | Jackson et al. | |
| 7,272,815 B1 | 9/2007 | Eldridge et al. | |
| 7,376,891 B2 | 5/2008 | Hitchock et al. | |
| 7,415,677 B2 | 8/2008 | Arend et al. | |
| 7,421,648 B1 | 9/2008 | Davis | |
| 7,478,338 B2 | 1/2009 | Yanchar et al. | |
| 7,490,314 B2 | 2/2009 | Yuknewicz et al. | |
| 7,640,496 B1 | 12/2009 | Chaulk et al. | |
| 7,644,390 B2 | 1/2010 | Khodabandehloo et al. | |
| 7,899,694 B1 | 3/2011 | Marshall et al. | |
| 7,930,201 B1 | 4/2011 | Issa et al. | |
| 8,042,063 B1* | 10/2011 | Lin-Hendel | G06F 3/0482 715/805 |
| 8,370,803 B1 | 2/2013 | Holler et al. | |
| 8,561,012 B1 | 10/2013 | Holler et al. | |
| 8,751,491 B2 | 6/2014 | Fitzmaurice et al. | |
| 8,863,107 B2 | 10/2014 | Krivopaltsev | |
| 9,129,240 B2 | 9/2015 | Holler et al. | |
| 2002/0062367 A1 | 5/2002 | Debber et al. | |
| 2002/0089526 A1 | 7/2002 | Buxton et al. | |
| 2002/0091732 A1 | 7/2002 | Pedro | |
| 2002/0138636 A1 | 9/2002 | Buttner et al. | |
| 2003/0033589 A1 | 2/2003 | Reyna et al. | |
| 2003/0046282 A1 | 3/2003 | Carlson et al. | |
| 2003/0061330 A1 | 3/2003 | Frisco et al. | |
| 2003/0103079 A1 | 6/2003 | Adatia et al. | |
| 2003/0158845 A1 | 8/2003 | Braley | |
| 2003/0160815 A1 | 8/2003 | Muschetto | |
| 2003/0163404 A1 | 8/2003 | Hu et al. | |
| 2003/0172020 A1 | 9/2003 | Davies et al. | |
| 2003/0182470 A1 | 9/2003 | Carlson et al. | |
| 2003/0182652 A1 | 9/2003 | Custodio | |
| 2003/0188290 A1 | 10/2003 | Corral | |
| 2003/0204644 A1 | 10/2003 | Vincent | |
| 2004/0081951 A1 | 4/2004 | Vigue et al. | |
| 2004/0186762 A1 | 9/2004 | Beaven et al. | |
| 2004/0243457 A1 | 12/2004 | D'Andrea et al. | |
| 2004/0243968 A1 | 12/2004 | Hecksel | |
| 2004/0268246 A1 | 12/2004 | Leban et al. | |
| 2005/0004825 A1 | 1/2005 | Ehrler et al. | |
| 2005/0065951 A1 | 3/2005 | Liston et al. | |
| 2005/0086239 A1 | 4/2005 | Swann et al. | |
| 2005/0086638 A1 | 4/2005 | Farn | |
| 2005/0114829 A1 | 5/2005 | Robin et al. | |
| 2005/0114830 A1 | 5/2005 | Knutson et al. | |
| 2005/0125771 A1 | 6/2005 | Vitanov et al. | |
| 2005/0132048 A1 | 6/2005 | Kogan et al. | |
| 2005/0198615 A1 | 9/2005 | Choi et al. | |
| 2005/0216879 A1 | 9/2005 | Ruhe | |
| 2005/0229157 A1 | 10/2005 | Johnson | |
| 2006/0036973 A1 | 2/2006 | Ogami et al. | |
| 2006/0069604 A1 | 3/2006 | Leukart et al. | |
| 2006/0123389 A1 | 6/2006 | Kolawa et al. | |
| 2006/0212327 A1 | 9/2006 | Norman | |
| 2006/0235771 A1 | 10/2006 | Oberoi | |
| 2006/0236261 A1 | 10/2006 | Forstall et al. | |
| 2007/0033567 A1 | 2/2007 | Carlson et al. | |
| 2007/0094609 A1 | 4/2007 | Gilboa et al. | |
| 2007/0124682 A1 | 5/2007 | Fukeda et al. | |
| 2007/0168918 A1 | 7/2007 | Metherall et al. | |
| 2007/0288292 A1 | 12/2007 | Gauger | |
| 2008/0077416 A1 | 3/2008 | Hetrick | |
| 2008/0077530 A1 | 3/2008 | Banas et al. | |
| 2008/0097734 A1 | 4/2008 | Raffo | |
| 2008/0154749 A1 | 6/2008 | D'hooghe et al. | |
| 2008/0172625 A1 | 7/2008 | Montgomery | |
| 2008/0282228 A1 | 11/2008 | Subramanyam | |
| 2008/0301296 A1 | 12/2008 | York | |
| 2009/0024647 A1 | 1/2009 | Hein | |
| 2009/0204465 A1 | 8/2009 | Pradhan | |
| 2009/0271760 A1 | 10/2009 | Ellinger | |
| 2009/0300580 A1 | 12/2009 | Heyhoe et al. | |
| 2010/0088664 A1 | 4/2010 | Khodabandehloo et al. | |
| 2010/0218092 A1 | 8/2010 | Xiang et al. | |
| 2010/0306730 A9 | 12/2010 | Carlson et al. | |
| 2015/0089448 A1 | 3/2015 | King et al. | |

OTHER PUBLICATIONS

Holler, Office Action, U.S. Appl. No. 12/101,089, Nov. 20, 2014, 16 pgs.

Akerman, Using Ontology to Support Development of Software Architectures, 2006, 13 pgs.

Ayewah, Evaluating Status Analysis Defect Warnings on Production Software, 2007, 7 pgs.

Barton, Reporting Scrum Project Progress to Executive Management Through Metrics, Jan. 2005, 9 pgs.

Boehm, A View of 20th and 21st Century Software Engineering, 2006, 18 pgs.

Cause, Delivering Real Business Value Using FDD, Winter 2004, 13 pgs.

Ceschi, Project Management in Plan-Based and Agile Companies, 2005, 7 pgs.

Chou, Redesigning a large and complex website: how to begin and a method for success, ACM, Providence, RI, Nov. 20-23, 2002, pp. 22-28.

CruiseControl, http://www.cruisecontrol.sourceforge.net/overview.html, Apr. 9, 2010, 1 pg.

CruiseControl, http://www.cruisecontrol.sourceforge.net/overview.html, Apr. 9, 2010, 34 pgs.

Danube Technologies, ScrumWorks Pro Documentation Web Client User Guide, Feb. 2007, 7 pgs.

Danube Technologies, ScrumWorks Quick Start Guide, v.1.4.2, Jan. 2006, 10 pgs.

Danube Technologies, ScrumWorks Web Client User Guide, v.1.4.2., Jan. 2006, 6 pgs.

DeLuca, FDD implementations, Nov. 2005, 10 pgs.

DeLuca, Parking Lot Chart—Aesthetics, Mar. 16, 2007, 2 pgs.

DeLuca, Parking Lot Chart Example 1, Dec. 17, 2003, 2 pgs.

DeLuca, Parking Lot Chart Example 2, Nov. 20, 2003, 1 pg.

DeLuca, Parking Lot Chart—Legend, Mar. 16, 2007, 2 pgs.

Derby, Agile Retrospectives, The Pragmatic Bookshelf, 2006, entire book, 186 pgs.

Fowler, The New Methodology, Dec. 13, 2005, 19 pgs.

Holler, Final Office Action, U.S. Appl. No. 12/101,089, Mar. 12, 2014, 16 pgs.

Holler, Notice of Allowance, U.S. Appl. No. 12/016,191, Jan. 15, 2014, 7 pgs.

Holler, Notice of Allowance, U.S. Appl. No. 12/016,192, Sep. 28, 2012, 8 pgs.

Holler, Notice of Allowance, U.S. Appl. No. 12/245,566, Nov. 26, 2013, 11 pgs.

Holler, Notice of Allowance, U.S. Appl. No. 12/247,963, Jan. 30, 2013, 8 pgs.

Holler, Notice of Allowance, U.S. Appl. No. 13/858,819, Apr. 3, 2014, 8 pgs.

Holler, Notice of Allowance, U.S. Appl. No. 12/357,225, Jun. 20, 2014, 12 pgs.

Holler, Office Action, U.S. Appl. No. 12/016,191, Nov. 12, 2010, 10 pgs.

Holler, Office Action, U.S. Appl. No. 12/016,191, Dec. 16, 2011, 13 pgs.

Holler, Office Action, U.S. Appl. No. 12/016,191, Jul. 19, 2012, 12 pgs.

Holler, Office Action, U.S. Appl. No. 12/016,191, Jun. 19, 2013, 13 pgs.

(56) References Cited

OTHER PUBLICATIONS

Holler, Office Action, U.S. Appl. No. 12/016,191, May 27, 2011, 16 pgs.
Holler, Office Action, U.S. Appl. No. 12/016,192, Nov. 18, 2011, 10 pgs.
Holler, Office Action, U.S. Appl. No. 12/016,192, Apr. 26, 2011, 11 pgs.
Holler, Office Action, U.S. Appl. No. 12/016,192, Apr. 30, 2012, 12 pgs.
Holler, Office Action, U.S. Appl. No. 12/016,193, Jul. 9, 2012, 10 pgs.
Holler, Office Action, U.S. Appl. No. 12/016,193, Jan. 30, 2013, 13 pgs.
Holler, Office Action, U.S. Appl. No. 12/101,084, Feb. 18, 2011, 14 pgs.
Holler, Office Action, U.S. Appl. No. 12/101,084, Jun. 21, 2013, 14 pgs.
Holler, Office Action, U.S. Appl. No. 12/101,084, Aug. 26, 2011, 17 pgs.
Holler, Office Action, U.S. Appl. No. 12/101,089, Jan. 9, 2012, 11 pgs.
Holler, Office Action, U.S. Appl. No. 12/101,089, Jun. 20, 2013, 13 pgs.
Holler, Office Action, U.S. Appl. No. 12/101,089, May 23, 2012, 16 pgs.
Holler, Office Action, U.S. Appl. No. 12/174,511, Jan. 4, 2013, 23 pgs.
Holler, Office Action, U.S. Appl. No. 12/174,511, Nov. 10, 2011, 18 pgs.
Holler, Office Action, U.S. Appl. No. 12/174,511, May 11, 2012, 21 pgs.
Holler, Office Action, U.S. Appl. No. 12/245,566, May 14, 2012, 15 pgs.
Holler, Office Action, U.S. Appl. No. 12/245,566, Apr. 24, 2013, 17 pgs.
Holler, Office Action, U.S. Appl. No. 12/245,566, Nov. 30, 2012, 16 pgs.
Holler, Office Action, U.S. Appl. No. 12/247,939, Jun. 7, 2012, 9 pgs.
Holler, Office Action, U.S. Appl. No. 12/247,939, Nov. 19, 2012, 9 pgs.
Holler, Office Action, U.S. Appl. No. 12/247,939, Apr. 26, 2013, 5 pgs.
Holler, Office Action, U.S. Appl. No. 12/247,963, Jul. 9, 2012, 23 pgs.
Holler, Office Action, U.S. Appl. No. 12/247,963, Mar. 15, 2012, 20 pgs.
Holler, Office Action, U.S. Appl. No. 12/247,963, Jun. 30, 2011, 18 pgs.
Holler, Office Action, U.S. Appl. No. 12/357,225, Oct. 3, 2013, 29 pgs.
Holler, Office Action, U.S. Appl. No. 12/357,225, Jul. 19, 2012, 28 pgs.
Holler, Office Action, U.S. Appl. No. 12/357,225, Nov. 23, 2012, 30 pgs.
Holler, Office Action, U.S. Appl. No. 13/858,819, Nov. 18, 2013, 10 pgs.
IBM / Cognos Software, Budgeting and Forecasting Software, Jun. 2, 2009, 3 pgs.
JetBrains, Distributed Build Management and Continuous Integration Server, Apr. 9, 2010, 2 pgs.
JetBrains, Distributed Build Management and Continuous Integration Server: Features, Apr. 9, 2010, 2 pgs.
JetBrains, TeamCity 3.0—Overview, Jun. 28, 2010, 8 pgs.
JetBrains, TeamCity 4.5, 2003-2009, 2 pgs.
Kolcz, Using SPEM/UML Profile to Specification of IS Development Processes, Oct. 2006, 68 pgs.
Li, Empirical Evaluation of Defect Projection Models for Widely-deployed Production Software Systems, 2004, 10 pgs.
Lyu, Software Reliability Engineering: A Roadmap, 2007, 18 pgs.
Microsoft Office Online, Demo: Base Sales Forecasts and Trendlines on Data, Jun. 2, 2009, 3 pgs.
Microsoft Office Online, Demo: Check that hunch with Excel what-if scenarios, Jun. 2, 2009, 1 pg.
Microsoft Office Online, Show trends and forecast sales with charts, Jun. 2, 2009, 7 pgs.
Microsoft Office Online, Understanding Scheduling in Microsoft Project 2002, Jun. 2, 2009, 7 pgs.
Mountain Goat Software, Training for Scrum task board use, 1998-2010, 5 pgs.
Netsuite, Standard & Advanced Sales Forecasting Software, 1999, 6 pgs.
Odenwelder, Notice of Allowance, U.S. Appl. No. 12/463,299, Dec. 4, 2012, 13 pgs.
Odenwelder, Office Action, U.S. Appl. No. 12/463,299, Apr. 25, 2012, 18 pgs.
Ouimet, SERT: Software Tool for Generating Student Engagement Reports, IEEE, ITNG'07, 2007, 8 pgs.
Phan et al., Progressive Multiples for Communication-Minded Visualization, ACM, Montreal, Canada, May 28-30, 2007, pp. 225-232.
Ribarsky et al., Glyphmaker: Creating Customized Visualizations of Complex Data, IEEE, Jul. 1994, pp. 57-64.
Robbins, Adopting Open Source Software Engineering Practices by Adopting OSSE Tools, 2005, 16 pgs.
Sandler, Source Control in Ten Minutes: A Subversion Tutorial, Jan. 24, 2006, 6 pgs.
Screenshot of Xplanner Date, 1 pg.
Shih et al., Using URLs and Table Layout for Web Classification Tasks, ACM, New York, NY, May 17-22, 2004, pp. 193-202.
Sneed, Reengineering Reports, IEEE, WRCE'04, 2004, 10 pgs.
Sugarcrm, Sugarsuite Screenshot, Apr. 8, 2010, 1 pg.
Vanguard Software, Forecasting software, Jun. 2, 2009, 4 pgs.
VersionOne, Exhibits A&B, Figures 1&2, May 31, 2007, 2 pgs.
VersionOne, Frequently Asked Questions, 2005, 4 pgs.
VersionOne, Simplify the rollout of Agile Development within Your Organization, 2007, 2 pgs.
VersionOne, Simplifying Software Delivery, 2006, 1 pg.
Xplanner how to notes, May 10, 2005, 9 pgs.
Yu, A Versatile Development Process for Small to Large Projects Using IBM CMVC, 1994, 9 pgs.
Almand, Office Action, U.S. Appl. No. 14/220,096, Nov. 3, 2015, 9 pgs.
Almand, Final Office Action, U.S. Appl. No. 14/220,096, Jun. 7, 2016, 9 pgs.
Holler, Notice of Allowance, U.S. Appl. No. 12/101,089, Jul. 11, 2016, 13 pgs.
Holler, Notice of Allowance, U.S. Appl. No. 13/890,179, Jul. 6, 2016, 14 pgs.
Holler, Office Action, U.S. Appl. No. 14/848,271, Jun. 16, 2016, 6 pgs.
Jansen, "On the Influence of Test-Driven Development on Software Design," Proceedings of the 19th Conference on Software Engineering Education & Training (CSEET'06) 2006 IEEE, <http://ieeexplore.ieee.org/stamp/stamp.js?tp=&arnumber=1617340>, 8 pgs.
Trask, Bruce, "Using Model-Driven Engineering to Complement Software Product Line Enginering in Developing Software Defined Radion Components and Applications," OOPSLA'06, Oct. 22-26, Portland, Oregon, <http://dl.acm.org/citation.cfm?id=1176733>, 8 pgs.
Holler, Final Office Action, U.S. Appl. No. 13/890,179, Jan. 21, 2016, 11 pgs.
Holler, Notice of Allowance, U.S. Appl. No. 14/246,019, Nov. 16, 2015, 8 pgs.
Kane, David, "Introducing Agile Development into Bioinformatics an Experience Report," 2003 IEEE, 1 pg., <http://ieee.org/stamp.jsp?tp+&arnumber+123146.>.
Memmel, T., et al., Agile Methods and Visual Specification in Software Development a Chance to Ensure Universal Access, 2007 springer, pp. 454-462, downloaded from <http://link.springer.com/chapter/10.1007/978-3-540-73279-2_51>.

(56) References Cited

OTHER PUBLICATIONS

Scacchi, Walt, Modeling Simulating and Enacting Complex Orgnizational Processes a Life Cycle Approach1, 1996 MIT, 21 pgs., <http//citeseerx.ist.psu.edu/viewdoc/download?doi=10.1.1.48.8110&rep=rep1&type=pdf>.
Xie, Qing, Developing cost-effective Model-Based Techniques for GUI Testing, 2006 ACM, pp. 997-1000, <http://dl.acm.org/citation.cfm?id+1134473>.
Holler, Notice of Allowance, U.S. Appl. No. 14/054,733, Apr. 13, 2015, 10 pgs.
Holler, Office Action, U.S. Appl. No. 13/890,179, Jun. 22, 2015, 12 pgs.
Holler, Office Action, U.S. Appl. No. 14/246,019, Jul. 20, 2015, 30 pgs.

\* cited by examiner

| File | Edit | View | Go | Bookmarks | Tools | Help | http://www.secure.v1host.com/ |

| My Home | Planning | Reports | Administration |

Getting Started | Setup | Product Planning | Workitem Planning —202 | Release Planning | Iteration Planning | Iteration Tracking | Retrospectives My Projects —206

Marketing Detail
-VersionOne
  Release 6.2
  Release 6.3
  Release 6.4
  Release 7.1
  Release 7.2 ←204
  Support
  Top Future Considerations

Stories and Defects | Story Breakdown | Theme Assignment | Requests | Issues | Import —Stories and Defects:
Filters: —238
Iteration: (All) ▶ Theme: (All) ▶ Status: (All) ▶ Owner: (All) ▶ Workitem: (All) ▶  Apply | Reset | Customize | Export (.xls) —226
Show Closed Items: ☐    232 Add Story | Add Defect 234                                     Show Tasks and Tests: ☐

| | 212 Title | 214 ID | 216 Owner | 218 Status | 220 Priority | 222 Estimate | 224 Project | 236 |
|---|---|---|---|---|---|---|---|---|
| ☐ | ⊖ TB Defect – No tracking capability when track at defect level | D-02982 | | | ▶ | | Release 7.2 | Edit\|More |
| ☐ | ⊖ Move to Teams – Team Dropdown Empty | D-03075 | donald | | ▶ | 1.00 | Release 7.2 | Edit\|More |
| ☐ | ⊖ Team Dropdown Shortlist include subprojects | D-03154 | | | ▶ | | Release 7.2 | Edit\|More |
| ☐ | ⊕ Multi-Select Goal Assignment ←208 | S-04822 | | | ▶ | 0.50 | Release 7.2 | Edit\|More |
| ☐ | ⊕ Remove Custom Attribute from User's Profile ←209 | D-03201 | | 228 230 | ▶ | | Release 7.2 | Edit\|More |
| ☐ | ⊖ Grid Filter Loses Plus/Minus State ←210 | D-03246 | | | ▶ | | Release 7.2 | Edit\|More |
| ☐ | ⊖ MVR Grids still don't refresh after "Assign" ←211 | D-03283 | | | ▶ | | Release 7.2 | Edit\|More |
| ☐ | ⊖ Check content type(s) on attachments | D-03287 | | | ▶ | | Release 7.2 | Edit\|More |
| ☐ | ⊕ Longer Menus | S-04616 | | Future | High ▶ | 1.00 | Release 7.2 | Edit\|More |
| ☐ | ⊕ Print View – Project Dashboard | S-04671 | | Future | High ▶ | 2.00 | Release 7.2 | Edit\|More |
| ☐ | ⊕ Print View – All Pages | S-02189 | | Future | High ▶ | 2.00 | Release 7.2 | Edit\|More |
| ☐ | ⊕ Legacy Updaters | D-02749 | | Future | High ▶ | 4.00 | Release 7.2 | Edit\|More |
| ☐ | ⊕ Different Icon for Broken Down Epics | S-04858 | dan | Future | Medium ▶ | 0.00 | Release 7.2 | Edit\|More |
| ☐ | ⊕ Grid Gadgets – Quicklist | S-04875 | rajiv, donald | In Progress | Medium ▶ | 1.00 | Release 7.2 | Edit\|More |
| ☐ | ⊕ Finish Up Close Completed Epic | S-04664 | dan | Future | Medium ▶ | 0.50 | Release 7.2 | Edit\|More |

Move to Project | Move to Iteration | Move to Team | Move to Theme | Close | Reopen | Delete

File | Edit | View | Go | Bookmarks | Tools | Help    http://www.secure.v1host.com/

My Home | Planning | Reports | Administration

My Projects
- Marketing Detail
  -VersionOne
  - Release 6.2
  - Release 6.3
  - Release 6.4
  - Release 7.1
  - Release 7.2
  - Support
  - Top Future Considerations Getting Started | Setup | Product Planning | Workitem Planning | Release Planning | Iteration Planning | Iteration Tracking | Retrospectives

Stories and Defects | Story Breakdown | Theme Assignment | Requests | Issues | Import Stories and Defects: | 232 Add Story | Add Defect | Apply | Reset | Customize | Export (.xls)

Filters:
Iteration: (All) ▼  Theme: (All) ▼  Status: (All) ▼  Owner: (All) ▼  Workitem: (All) ▼  Task/Test: (All) ▼
Show Closed Items: ☐                                                                    Show Tasks and Tests: ☐

| Title | ID | Owner | Status | Priority | Estimate | |
|---|---|---|---|---|---|---|
| ⊕ Different Icon for Broken Down Epics | S-04858 | dan | Future | Medium ▼ | 0.00 | Edit\|More |
| ⊕ Grid Gadgets – Quicklist | S-04875 | rajiv, donald | In Progress | Medium ▼ | 1.00 | Edit\|More |
| ⊕ Finish Up Close Completed Epic | S-04664 | dan | Future | Medium ▼ | 0.50 | Edit\|More |
| ⊕ Breakdown to Epic – Clean up the UI & ATs | S-04870 | donald | Future | Medium ▼ | 2.00 | Edit\|More |
| ⊕ Breakdown to Epic – Clean up the backend | S-04871 | rajiv | Future | Medium ▼ | 1.00 | Edit\|More |
| ⊕ Upgrade breakdown data during setup | S-04872 | pavel | Future | Medium ▼ | 2.00 | Edit\|More |
| ⊕ Theme Filters Up and Down Perf Changes | S-04687 | patrick | Future | Medium ▼ | 1.00 | Edit\|More |
| ⊕ Epic Relationship Rollups | S-04554 | patrick | Future | Medium ▼ | 0.50 | Edit\|More |
| ⊕ Split & Copy Story Retains Epic Parent | S-04662 | pavel | Future | Medium ▼ | 1.00 | Edit\|More |
| ⊕ Tm: Assigning to a new team via scheduling | S-04707 | donald | Future | Medium ▼ | 2.00 | Edit\|More |
| ⊕ Breakdown Planner | S-04318 | | Future | Medium ▼ | 1.00 | Edit\|More |
| ⊕ Drag & Drop on Iteration Plan/Track | S-04645 | | Future | Medium ▼ | 2.00 | Edit\|More |
| ⊕ Grid Gadgets – Multi-Select | S-04874 | rajiv, donald | In Progress | Medium ▼ | 1.00 | Edit\|More |
| ⊕ Grid Gadgets – MVR | S-04873 | rajiv, donald | In Progress | Medium ▼ | 2.00 | Edit\|More |
| ⊕ Grid Gadgets – Miscellaneous | S-04876 | rajiv, donald | In Progress | Medium ▼ | 2.00 | Edit\|More |

Move to Project | Move to Iteration | Move to Team | Move to Theme | Close | Reopen | Delete

Figure 2D

Backlog Item Planner

Backlog Item

Main

ID: B-01019
Title: Enter RMA
Project: Team A
Iteration: Month C 1st Half  } 272
Feature Group: Administration
Description:
Estimate: 2.00

273 → Tasks and Tests

| Title 212 | ID 214 | Owner 216 | Detail Estimate 268 | | |
|---|---|---|---|---|---|
| | | | Add Task 275 | Add Test 276 | Customize | Export (.xls) |
| 274 → Enter RMA Using Order Number | AT-01034 | BT | 4.00 | 277 → Edit | More |
| Enter RMA Without Order Number | AT-01068 | BT | 4.00 | Edit | More |
| Build | TK-01070 | AS | 8.00 | Edit | More |
| Code Review | TK-01072 | TC,DD | 4.00 | Edit | More |

Test

Main

ID: AT-01034
Title: Enter RMA Using Order Number  ─279
Description: This test will encompass a set of criteria specific to the condition of new prospect behavior. There are
several points of focus including:
- Call Time
- Availability

284

Owner ▼ BT  ─281, 282
Estimate 4.00  ─283

285 ─ OK | Cancel   286

Template Details

Defect 2026                    Edit 2034           Close 2036

Main

⎧ ID: D-01027
⎪ Title: My High Priority Defects ◄—2018
⎪ Project: Call Center ◄—2022
2032-A ⎨ Iteration:
⎪ Feature Group:
⎪ Estimate:
⎩ Description:

Extended

⎧ Owners: Jeff ◄—2038
⎪ Status:
⎪ Priority: High ◄—2020
2032-B ⎨ Type:
⎪ Source:
⎪ Reference:
⎪ Environment:
⎩ Found in Build:

Related Assets 2040

Tasks                                                              2044
                                                              Add | Customize | Export (.xls)
Title         ID         Owner      Status    Detail Estimate    Done    To Do
2042         TK-01277   jeff                                                    2045 — Edit|More
Verify Defect            2043

INTEGRATED PLANNING ENVIRONMENT FOR AGILE SOFTWARE DEVELOPMENT

RELATED APPLICATIONS

This application is a continuation of U.S. patent application Ser. No. 12/016,191, filed on Jan. 17, 2008, tiled "Integrated Planning Environment for Agile Software Development," which is hereby incorporated by reference in its entirety.

TECHNICAL FIELD

The disclosed embodiments relate generally to managing agile software development, and more particularly, to providing a common interface for asset planning associated with agile software development.

BACKGROUND

Agile software development refers to software development methodologies in which software is developed incrementally in steps referred to as iterations. Iterations typically are measured in weeks and may vary in length from one week or less to one month or more.

Examples of agile software development methodologies include Scrum, Extreme Programming (XP), Crystal, Lean Development, AgileUP, and Dynamic Systems Development Method (DSDM). Agile software development methods also have been referred to as lightweight methods. Methodologies may have their own vocabulary. For example, an iteration may be referred to as a sprint or a timebox, depending on the methodology. Agile software development is distinguishable from the "waterfall" model of sequential software development.

Software for implementing agile development methodologies and for tracking and reporting on projects that use agile methodologies can help developers to realize fully the benefits, such as flexibility and rapid cycle times, offered by these methodologies. Accordingly, there is a need for robust agile development management software that is convenient to use.

SUMMARY

A method of managing agile software development includes displaying assets associated with an agile software development process. Selection of a first link corresponding to a respective asset of the displayed assets is detected; in response, one or more related assets associated with the respective asset are displayed. In one aspect of the method, selection of a second link corresponding to a first related asset of the one or more related assets is detected; in response, a user interface for editing attributes of the first related asset is displayed, wherein the user interface and the one or more related assets are displayed in a common window. In another aspect of the method, selection of a first related asset of the one or more related assets is detected; in response, attributes of the first related asset are displayed, wherein the one or more related assets and the attributes of the first related asset are displayed in a common window.

A system for managing agile software development includes memory, a display, one or more processors, and one or more programs stored in the memory and configured for execution by the one or more processors. The one or more programs include instructions to display assets associated with an agile software development process; instructions to detect selection of a first link corresponding to a respective asset of the displayed assets; and instructions to display, in response to detecting selection of the first link, one or more related assets associated with the respective asset. In one aspect, the one or more programs also include instructions to detect selection of a second link corresponding to a first related asset of the one or more related assets and instructions to display, in response to detecting selection of the second link, a user interface for editing attributes of the first related asset, wherein the user interface and the one or more related assets are displayed in a common window. In another aspect, the one or more programs also include instructions to detect selection of a first related asset of the one or more related assets and instructions to display, in response to detecting selection of the first related asset, attributes of the first related asset, wherein the one or more related assets and the attributes of the first related asset are displayed in a common window.

A computer readable storage medium stores one or more programs configured to be executed by a computer system to manage agile software development. The one or more programs include instructions to display assets associated with an agile software development process; instructions to detect selection of a first link corresponding to a respective asset of the displayed assets; and instructions to display, in response to detecting selection of the first link, one or more related assets associated with the respective asset. In one aspect, the one or more programs also include instructions to detect selection of a second link corresponding to a first related asset of the one or more related assets and instructions to display, in response to detecting selection of the second link, a user interface for editing attributes of the first related asset, wherein the user interface and the one or more related assets are displayed in a common window. In another aspect, the one or more programs also include instructions to detect selection of a first related asset of the one or more related assets and instructions to display, in response to detecting selection of the first related asset, attributes of the first related asset, wherein the one or more related assets and the attributes of the first related asset are displayed in a common window.

BRIEF DESCRIPTION OF THE DRAWINGS

FIGS. 2A, 2D, and 2E are schematic screenshots of a user interface displaying assets associated with an agile software development process in accordance with some embodiments.

FIGS. 2F and 2G are schematic screenshots of a user interface for viewing an asset's attributes and related assets in accordance with some embodiments.

FIGS. 2H-2J are schematic screenshots of user interfaces relating to asset templates in accordance with some embodiments.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
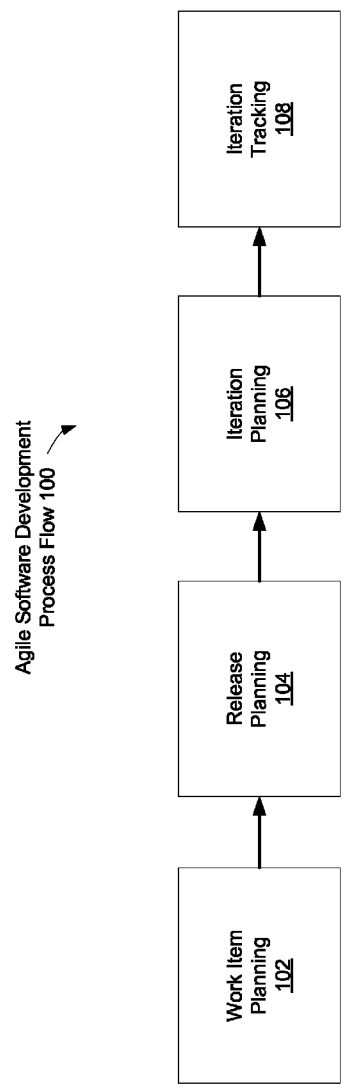
FIG. 1 is a flow diagram illustrating an agile software development process flow 100 in accordance with some embodiments.

FIG. 1 is a flow diagram illustrating an agile software development process flow 100 in accordance with some embodiments. Support for performing operations in the process flow 100 can be provided by agile development management software.

Work item planning (102) includes identifying work to be performed during the software development process. For example, features to be included in the software being developed are specified and software defects to be fixed during development are identified. Depending on the agile methodology being used, features also may be referred to as stories, backlog items, or requirements. In general, a work item is any item for which the agile development management software platform can track progress, such as time spent working on the item.

Release planning (104) includes assigning identified work items (e.g., features and defects) to particular planned software releases. For example, certain features may be included in an initial release, with additional features to be added in subsequent releases. Similarly, fixing various defects may be scheduled across multiple releases. More generally, release planning may include assigning identified work items to levels or nodes in a project hierarchy. The project hierarchy may include projects, sub-projects, releases, teams and other internal organizations, clients or customers, and vendors.

Iteration planning (106) includes assigning work items to iterations. There may be multiple iterations performed to prepare a particular software release; iteration planning thus involves specifying what work will be performed in which iterations. For example, features and defects are assigned to particular iterations. Within each iteration, tasks and tests corresponding to the features and defects are defined. A task is a unit of work performed as part of delivering a feature. In some embodiments, a task is defined such that it takes no more than 3 days to perform. A test is an acceptance criterion that a feature must satisfy. Estimates for the time required to complete tests and tasks may be entered.

The actual time spent working on the work items (e.g., on the features and defects and their corresponding tasks and tests) during an iteration is tracked (108) and compared against the estimates. Progress and status reports may be displayed graphically. For example, a "dashboard" user interface may display multiple graphical reports. Possible graphical reports include burndown charts, velocity charts, burn-up charts, Gantt charts, parking lot reports, scope change, defect trending, test case status, and defect actuals. A burndown chart illustrates remaining work vs. time. Velocity refers to the estimated work per iteration on a project. Scope change refers to a change in requirements, such as the addition or deletion of features and defects. Parking lot reports are described below with regard to FIG. 2K. Reports may be generated for a specified level or node in the project hierarchy (e.g., for a specified project, sub-project, release, team or other internal organization, client or customer, and/or vendor.)

The operations in the development process flow 100 are presented sequentially in FIG. 1 for purposes of illustration. However, the operations need not be performed sequentially. For example, the planning operations 102, 104, and 106 may be updated dynamically throughout the agile development process. Similarly, tracking 108 may be performed dynamically, and may prompt subsequent planning changes. Furthermore, multiple operations may be combined into a single operation and additional operations may be added to the flow 100.

At a high level, the agile software development process has various assets associated with it. Nodes in the project hierarchy, such as projects, sub-projects, releases, teams, clients, and vendors, can be considered assets, as can iterations. Work items such as features and defects are assets, as are tasks and tests. Assets may be associated with other assets. In some embodiments, for example, tasks and tests are associated with (i.e., are related to) corresponding features and defects, which in turn may be associated with corresponding iterations.

An asset includes various attributes. In some embodiments, each kind of asset (e.g., project, feature, task, etc.) has a specified set of associated attributes. Types of attributes include text strings, numerical values, values calculated according to a formula ("synthetic attributes"), and associated assets. A first asset associated with a second asset thus is considered an attribute of the second asset. An attribute may be automatically included (e.g., hard-coded or created for a particular installation) in agile development management software or may be customized (i.e., user-defined).

Attention is now directed to user interfaces for agile development management software. In some embodiments, user interfaces are shown in a browser window. In some embodiments, user interfaces are shown by a stand-alone application.

Agile development management software can display groups of assets of a particular type. For example, groups of assets associated with work item planning, release planning, or iteration planning may be displayed.

FIG. 2A is a schematic screenshot of a user interface 200 displaying a group 201 of assets associated with an agile software development process, in accordance with some embodiments. In some embodiments, the particular type of group is determined by selecting a tab, selection box, radio button icon, or item in a drop-down menu. For example, in FIG. 2A a "workitem planning" tab 202 has been selected, indicating that the group 201 is a work item planning group. A group of a particular type may include multiple kinds of assets. For example, the work item planning group 201 includes features (e.g., "Multi-Select Goal Assignment" 208) and defects (e.g., "Grid Filter Loses Plus/Minus State" 210), as indicated by features icons 209 and defects icons 211.

The displayed assets in the group 201 are associated with a particular project hierarchy node 204, displayed for example in a project selection window 206.

Assets may be added to the group 201, for example, by selecting an "add story" (i.e., add feature) link 232 or an "add defect" link 234. In general, a user interface for displaying a group of assets may include multiple links or icons for adding multiple respective kinds of assets, or may include a single link or icon for adding assets. In some embodiments, selection of a link or icon for adding assets results in the display of a separate user interface for adding assets (not shown).

Assets displayed in the group 201 also may be edited, for example, by selecting an "edit" link (e.g., 236) corresponding to a respective asset. In some embodiments, selection of an edit link or corresponding icon results in the display of a separate user interface for editing assets, as described below with regard to FIGS. 2E-2G.

The displayed assets include a set of attributes selected for display, such as title 212, ID 214, owner 216, status 218, priority 220, estimate 222, and project 224. Some of the attributes are also assets, such as project 224. Some of the values for the attributes are blank: for example, no owner 216, status 218, priority 220, or estimate 222 is shown for a number of assets, including feature 208.

Assets to be displayed in the group 201 may be filtered according to one or more attributes using filters 238.

A subset of the displayed attributes includes user input fields to accept edits to attribute values. For example, a user may select a priority from a drop-down box 228 and may enter a work or size estimate (e.g., an estimate of time) in a text input box 230.

Figure 2B:
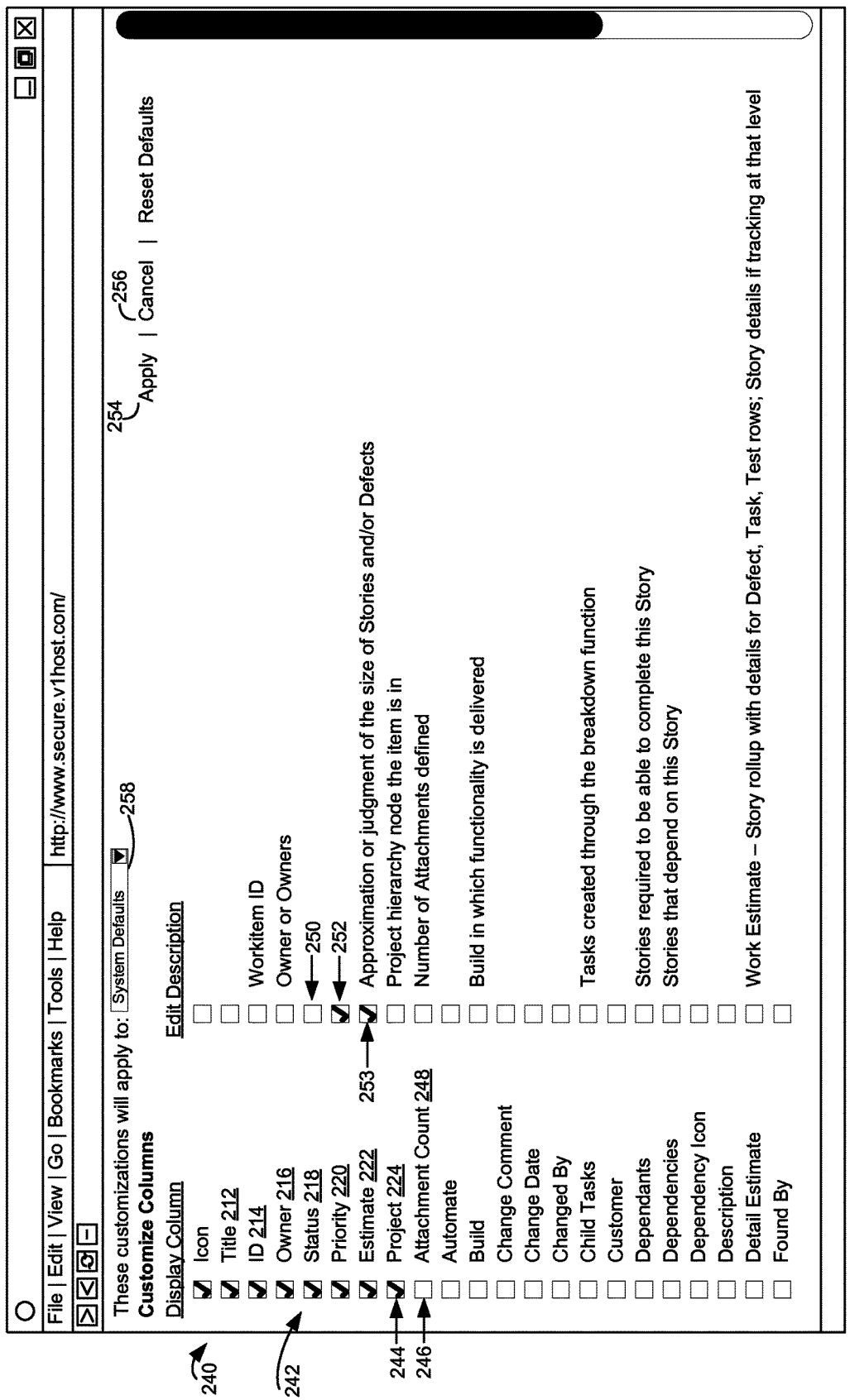
FIGS. 2B and 2C are schematic screenshots of a customization user interface displaying available attributes associates with assets in accordance with some embodiments.

Upon detecting user selection of a customization link or icon, such as "customize" link 226, a customization user interface 240 is displayed that shows a group of available attributes 242, as illustrated in FIG. 2B in accordance with some embodiments. In the example of FIG. 2B, the group 242 is shown as a list. The available attributes include the set of attributes selected for display and may include additional attributes that are not currently selected for display. In some embodiments, the group of available attributes may be viewed directly from the user interface 200, for example via a drop-down menu, instead of through the customization user interface 240.

Figure 2C:
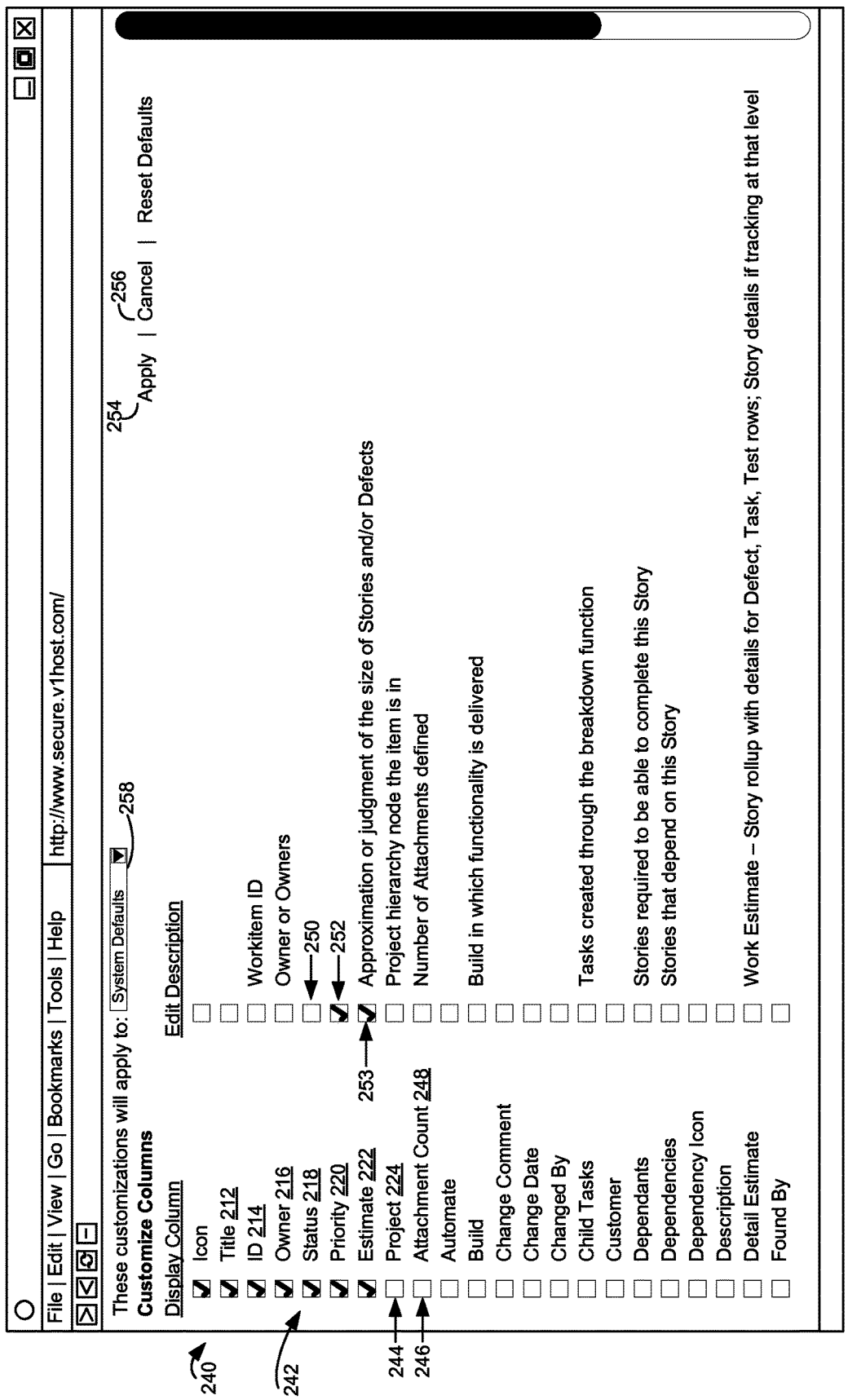

The customization user interface 240 allows a user to select or de-select attributes for display. "Display selection boxes" (e.g., 244 and 246) associated with respective attributes (e.g., "project" 224 and "attachment count" 248) indicate which attributes are currently selected for display. For example, the checked display selection boxes in FIG. 2B correspond to the set of attributes displayed for the group 201 of assets in user interface 200 (FIG. 2A). The user may select an attribute (i.e., add the attribute to the set selected for display) or de-select an attribute (i.e., remove the attribute from the set selected for display) by clicking on the corresponding display selection box (e.g., with a mouse or other selection device). For example, clicking on display selection box 244 deselects the "project" attribute 224, as illustrated in FIG. 2C. Similarly, clicking on display selection box 246 selects the "attachment count" attribute 248 for display. Alternate means of selecting and deselecting attributes are possible, such as clicking on a radio button associated with the attribute or clicking on the attribute itself.

Changes to the set of selected attributes may be applied by selecting an "apply" icon 254 or may be canceled by selecting a "cancel" icon 256. Once the changes have been applied, the updated set of selected attributes is included in displays of groups of assets of the same type as the group 201. For example, when a "work item planning" group 270 is displayed subsequent to de-selection of the "project" attribute 224, the "project" attribute 224 is not included in the display, as illustrated in FIG. 2D in accordance with some embodiments. If the "attachment count" attribute 248 had been selected, the "attachment count" attribute would be included in subsequent display of the group 270.

The customization user interface 240 also allows a user to specify whether to permit particular attributes to be edited. "Editing selection boxes" (e.g., 250 and 252) associated with respective attributes (e.g., "status" 218 and "priority" 220) indicate which attributes are in the subset to be displayed with user input fields. For example, the checked editing selection boxes 252 and 253 in FIG. 2B correspond to the subset of attributes (i.e., attributes 220 and 222) with user input fields in user interface 200 (FIG. 2A). The user may select an attribute for editing (i.e., add the attribute to the subset) or de-select an attribute for editing (i.e., remove the attribute from the subset) by clicking on the corresponding editing selection box (e.g., with a mouse or other selection device). In the example of FIGS. 2B and 2C, adding "status" 218 to the subset (e.g., by clicking on box 250) would cause subsequently displayed work item planning groups to include user input fields for the "status" attribute 218. Removing "priority" 220 from the subset (e.g., by clicking on box 252) would cause subsequently displayed work item planning groups not to include user input fields for the "priority" attribute 220.

Customized settings entered in the user interface 240 regarding the display of attributes and the ability to edit attributes may apply only to a particular user or may apply to multiple users. For example, a customized setting may be created as a system default for all users viewing a particular type of group of assets (e.g., a work item planning group, a release planning group, or an iteration planning group). In some embodiments, a user must have particular privileges, such as system administrator privileges, to create a system default customized setting. More generally, customized settings may be created that serve as a default for all users at or below a particular node in the project hierarchy. For example, a customized setting may serve as a default for all users on a particular team or on a group of teams, or for all users working on a particular project, sub-project, or release. In some embodiments, a user creating a particular default setting must have appropriate corresponding privileges. For example, authority to create a customized default for a particular team could be limited to the team leader.

In the user interface 240, the level of application of the customized setting is specified using a drop-down menu 258. The "system defaults" level shown as selected in the drop-down menu 258 indicates that the customized setting applies to all users viewing groups of the corresponding type. In some embodiments, the "system defaults" option will not be displayed in the drop-down menu 258 unless the user has already logged on as a system administrator or with other appropriate privileges.

In some embodiments, a user can override a default customized setting (e.g., a system default) by creating a user-specific customized setting, also known as a personalized setting. For example, the user may use the drop-down menu 258 to specify that a customized setting created via user interface 240 is specific to that user. This personalized setting then will control the display and ability to edit attributes for assets in a group of a particular type. If a user does not have a personalized setting, the default customized setting will control the display and ability to edit attributes associated with the group. In some embodiments, a system administrator or other user with appropriate privileges may specify, for a particular default customized setting, whether individual users are permitted to override the default. In some embodiments, individual users are permitted to override the default with regard to attributes to be displayed, but not with regard to attributes to be edited.

Figure 2E:
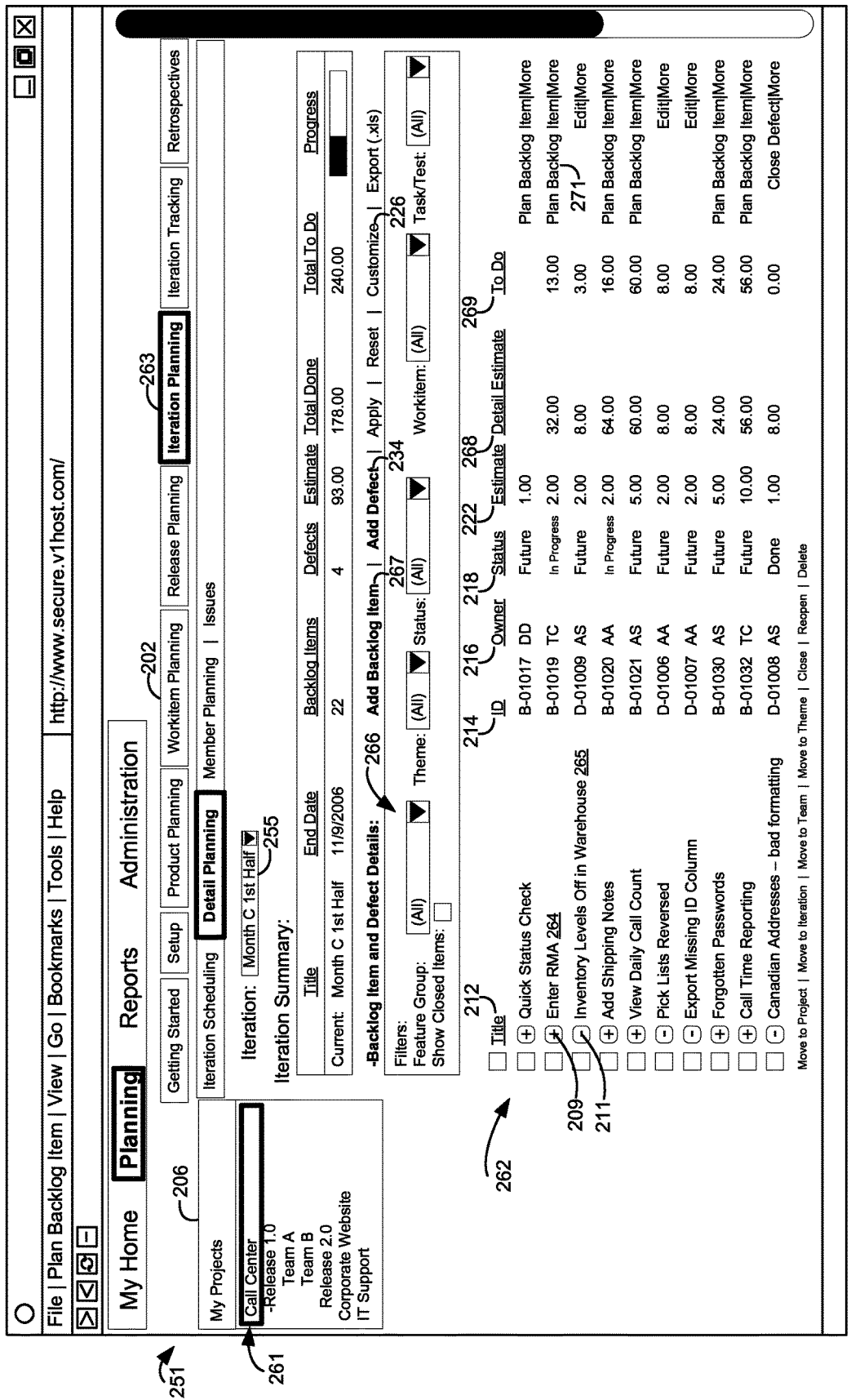

Attention is now directed to accessing and displaying user interfaces for viewing an asset's attributes and related assets. FIG. 2E, like FIG. 2A, is a schematic screenshot of a user interface displaying a group of assets associated with an agile software development process in accordance with some embodiments. Specifically, the user interface 251 of FIG. 2E displays a group 262 of assets associated with iteration planning, as indicated by selection of an "iteration planning" tab 263. The iteration planning group 262 includes features (e.g., "Enter RMA" 264) and defects (e.g., "Inventory Levels Off in Warehouse" 265), as indicated by features icons 209 and defects icons 211. The displayed assets in the group 262 are associated with a particular iteration 255. The displayed assets in the group 262 also are associated with a particular project hierarchy node 261, displayed for example in the project selection window 206. The project hierarchy node 261 corresponds to a project entitled "Call Center," which includes multiple software releases (e.g., "Release 1.0" and "Release 2.0") and has multiple teams (e.g., "Team A" and "Team B") working on releases. Each release and each team may be selected as a project hierarchy node in the project selection window 206. In some embodiments, in response to selection of a particular project hierarchy node, the displayed group of assets is updated to display assets associated with the selected project hierarchy node. For example, in response to selection of a particular release or team, the displayed group 262 of assets is updated to display assets associated with iteration planning for the selected release or team.

Assets to be displayed in the group 262 may be filtered according to one or more attributes using filters 266. Assets may be added to the group 262 by, for example, selecting an "add backlog item" link 267 or an "add defect" link 234.

The displayed assets in the group 262 include a set of attributes, such as title 212, ID 214, owner 216, status 218, estimate 222, detail estimate 268, and "to do" 269. The "estimate" 222 and "detail estimate" 268 attributes provide estimates of quantities of work associated with assets, while the "to do" 269 attribute provides estimates of quantities of work remaining to be done for assets. As discussed with regard to FIG. 2A, some of the attributes may be assets associated with a displayed asset in the group 262 (i.e., may be related assets).

Figure 2F:
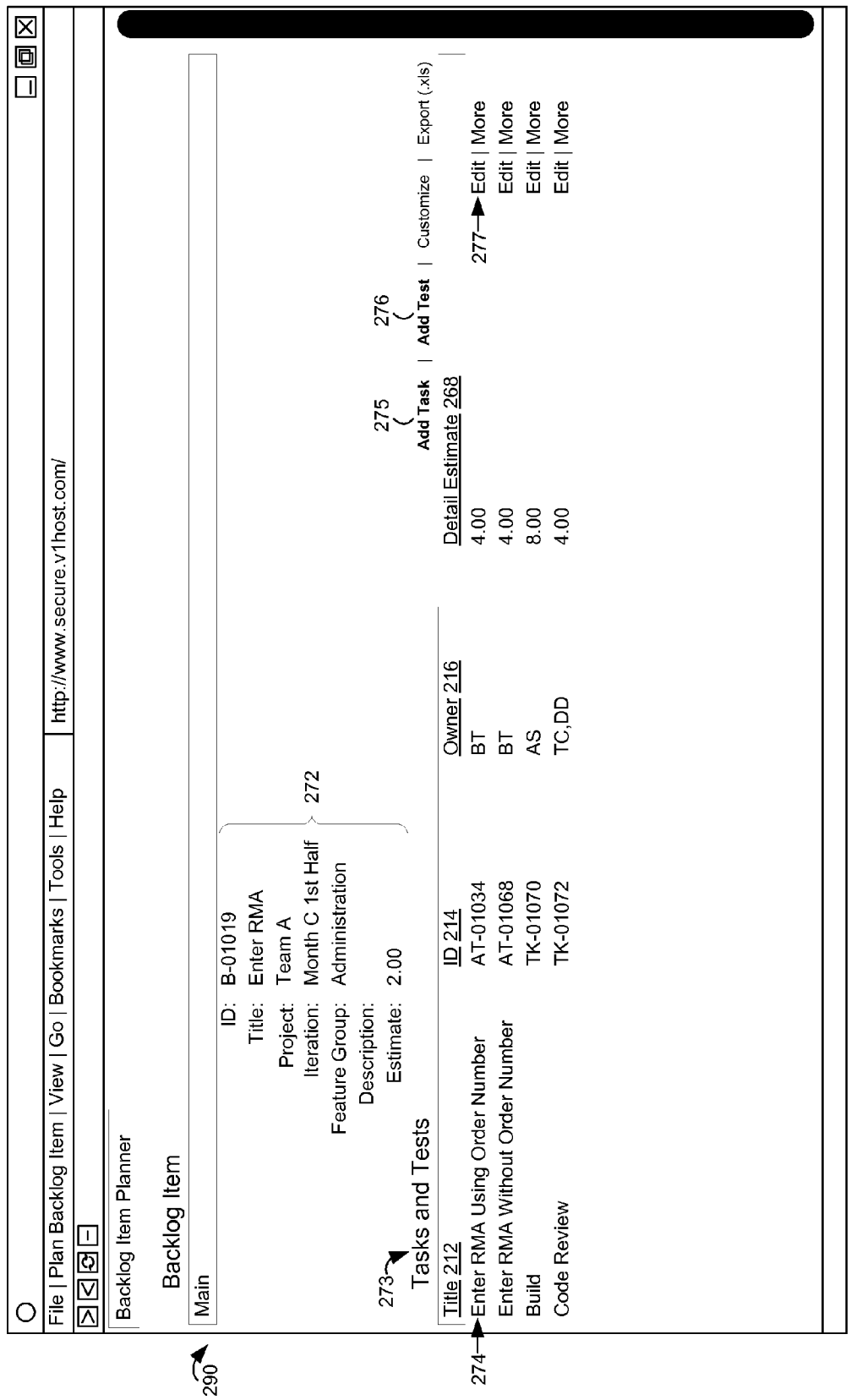

In some embodiments, an asset displayed in the group 262 may be edited by selecting a link corresponding to the asset, which results in display of a separate user interface (UI) for editing the asset. For example, selection of the "plan backlog item" link 271 for the "enter RMA" asset 264 results in display of a window 290 (FIG. 2F). The window 290 displays attributes 272 of the "enter RMA" asset 264, such as ID, title, project, iteration, feature group, description, and estimate. In some embodiments, the attributes are displayed in a list.

The window 290 also displays related assets 273 associated with the "enter RMA" asset 264. In this example, the related assets 273 include tasks and tests associated with the "enter RMA" asset 264, which is a feature. Attributes of the related assets 273 (e.g., title 212, ID 214, owner 216, and detail estimate 268) are displayed.

The related assets 273 may be edited by selecting a corresponding link. For example, related asset 274 ("Enter RMA Using Order Number") may be edited by selecting an "edit" link 277. In some embodiments, in response to selection of the "edit" link 277, a UI 278 (FIG. 2G) for editing the related asset 274 is displayed in the window 290 along with the attributes 272 and related assets 273. The UI 278 includes user input fields (e.g., 279, 281, 283, and 284) to display and receive edits to attributes of the related asset 274. In some embodiments, the UI 278 includes drop-down menus (e.g., 280, 282) to select values for attributes of the related asset 274. In some embodiments, the user may enter values directly into the user input fields. Edits may be applied by selecting the "OK" link 285 or canceled by selecting the "cancel" link 286. In some embodiments, upon selection of the "OK" link 285, display of the UI 278 is ceased and displayed attribute values for the edited related asset 274 are updated in response to the edits. The user then may select another edit link associated with another related asset, resulting in display of another UI 278 within the window 290 for displaying and editing the newly selected related asset. In some embodiments, multiple UI's for displaying and editing multiple respective related assets may be open simultaneously within the window 290 and may be accessed simply by scrolling within the window 290.

In some embodiments, a new related asset may be added via the window 290. For example, a new task or test for the "enter RMA" asset 264 may be added by selecting the "add task" link 275 or "add test" link 276. In some embodiments, selection of the "add task" link 275 or "add test" link 276 results in display, within the window 290, of a user interface analogous to UI 278 for which the user input fields (e.g., 279, 281, 283, and 284) are blank. The user may enter attribute values for the new task or test through the user input fields. In some embodiments, the user may specify attribute values via drop-down menus (e.g., 280, 282). In some embodiments, creation of the new task or test is completed by selecting the "OK" icon 285 or canceled by selecting the "cancel" icon 286. In some embodiments, upon selection of the "OK" icon 285, display of the UI for creating the new related asset is ceased and the new related asset is displayed among the related assets 273.

In some embodiments, the drop-down menu 280 displays asset templates from which a related asset 273 may be created. Asset templates are discussed below with regard to FIGS. 2H-2J.

The window 290 thus provides a single integrated interface through which a user may view multiple levels of information for an asset in addition to performing edits. For example, the user may view attributes of the asset itself and of related assets, and may edit or create related assets. The integrated interface allows the user to perform these tasks without having to browse through a succession of windows.

Figure 2H:
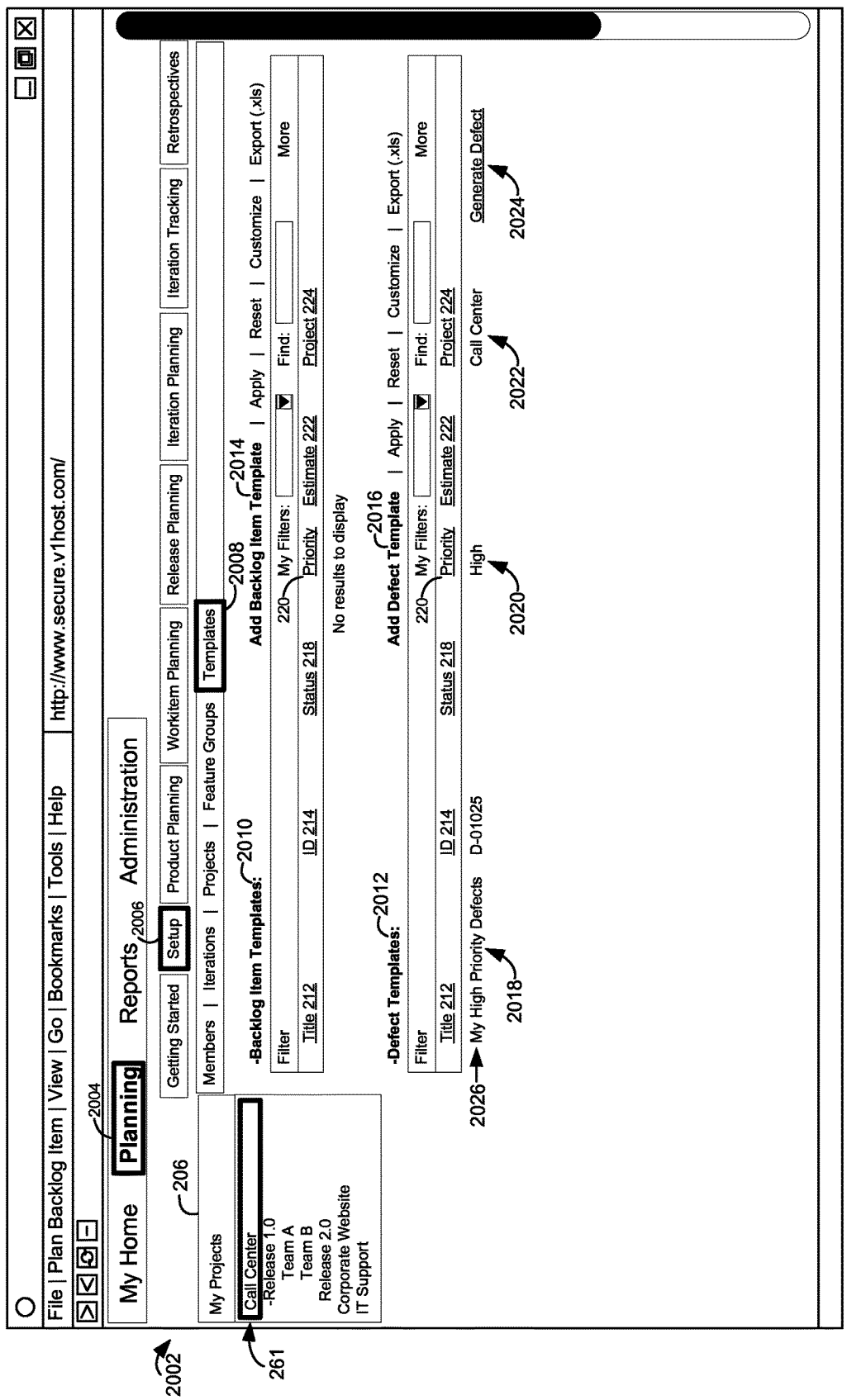

Attention is now directed to creation and use of asset templates. In some embodiments, asset templates may be defined and used to simplify creation of new assets. FIG. 2H is a schematic screenshot of a user interface 2002 displaying available asset templates in accordance with some embodiments. The UI 2002 may be accessed, for example, by selecting one or more links, icons or tabs (e.g., "planning" link 2004, "setup" tab 2006, and "templates" tab 2008). In some embodiments, asset templates displayed in the UI 2002 are separated by asset type: backlog item templates 2010, for example, are listed separately from defect templates 2012. Asset templates displayed in the UI 2002 also may be associated with a particular project hierarchy node, such as the "Call Center" project hierarchy node 261. In the UI 2002 one defect template 2026 ("My High Priority Defects") and no backlog item templates have been defined for the "Call Center" project.

In some embodiments, an asset template includes identifying attributes such as a title 212 and/or an ID 214, and also includes values for one or more additional attributes, such as status 218, priority 220, estimate 222, or project 224. Other examples of additional attributes include any of the attributes in the group 242 (FIG. 2B). The values for these additional attributes serve as default values for assets generated from the template. For example, attributes for the template 2026 include a "High" priority 2020 and the "Call Center" project 2022. An asset that is created from the template 2026 will have a "High" priority 2020 and will be associated with the "Call Center" project 2022, unless otherwise edited. This template thus enables users to create "High" priority defects for the "Call Center" project without having to enter the priority and project for each defect.

FIG. 2I is a schematic screenshot of a user interface 2030 displaying an asset template in accordance with some embodiments. The UI 2030 may be accessed by selecting the asset template, for example, by clicking on the title 2018 in UI 2002 (FIG. 2H). The UI 2030 displays attributes 2032 of the selected template. In some embodiments, the displayed attributes 2032 are separated into different groups, such as "main" attributes 2032-A and "extended" attributes 2032-B. The template 2026 displayed in the UI 2030 has attribute values including an owner "Jeff" 2038, a "High" priority 2020, and the "Call Center" project 2022. Other attributes for the template 2026 are blank. Values for blank attributes may be entered by a user when creating an asset from the template.

In some embodiments, an asset template includes related assets 2040 to be associated with an asset created from the asset template. For example, a template for a feature (e.g., a backlog item) or defect may include one or more related tasks (e.g., "Verify Defect" 2042) or tests to be associated with the feature or defect created from the template. In some embodiments, the template defines values for attributes of the related assets. For example, the task 2042 has an owner "Jeff" 2043. Creation of an asset from a template with a related asset results in creation of the related asset as well: the related asset specified in the template is automatically created and associated with the asset created from the template. The related asset created in this manner includes attribute values as specified in the template.

In the UI 2030, a related asset 2040 may be added to the template 2026 by selecting the "add" link 2044 and may be edited by selecting a corresponding "edit" link 2045. Inclusion of related assets in an asset template spares users from having to create related assets for each newly created asset.

To edit the asset template 2026, the user selects the "edit" button 2034. To cease display of the asset template 2026, the user selects the close button 2036.

Figure 2J:
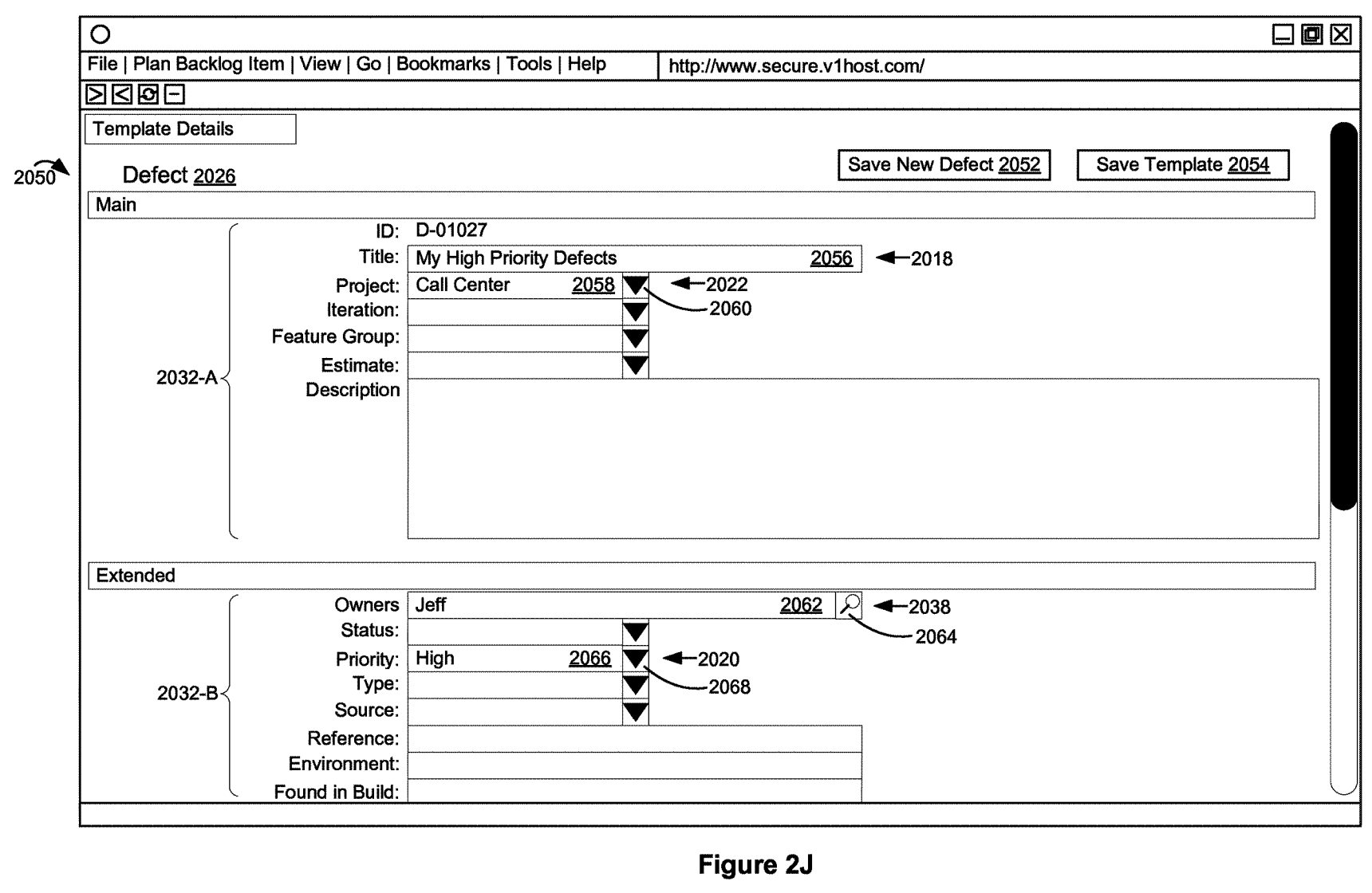

FIG. 2J is a schematic screenshot of a user interface 2050 for editing or creating an asset template 2026 or for creating an asset from the asset template 2026 in accordance with some embodiments. In some embodiments, the UI 2050 is accessed by selecting the "edit" button 2034 (FIG. 2I), the "add defect template" link 2016 (FIG. 2H), or the "generate defect" link 2024 (FIG. 2H), or by otherwise selecting an asset template to be edited. The UI 2050 includes user input fields (e.g., 2056, 2058, 2062, and 2066) to specify values for attributes 2032. In some embodiments, the user may enter attribute values directly into the user input fields. In some embodiments, attribute values may be selected through drop-down menus (e.g., 2060 and 2068) or through a separate user interface (e.g., a list of possible values, such as a list of possible owners 2038) accessed through a search icon 2064.

Once all desired attribute values have been entered, the "save new defect" button 2052 may be selected to create an asset having the attribute values for the template 2026 as well as other attribute values entered through UI 2050. In some embodiments, when creating an asset from the template 2026, the user may edit the attribute values associated with the template. For example, the user may assign a different owner 2038 than "Jeff" or may assign a different priority 2020 than "High."

Alternatively, once all desired attribute values have been entered, the "save template" button 2054 may be selected to save the attribute values associated with the template. The saved attribute values become default values for future assets created from the template.

Attention is now directed to displaying reporting data with parking lot reports. In some embodiments, parking lot reports display degrees of completion for multiple groups of assets in an agile software development project. In some embodiments, the assets are grouped by function or by various topics, which may be user-defined. For example, the assets may be features that are grouped into feature sets. Feature sets, sometimes referred to as themes, may be grouped in turn into parent feature sets, or parent themes.

Figure 2K:
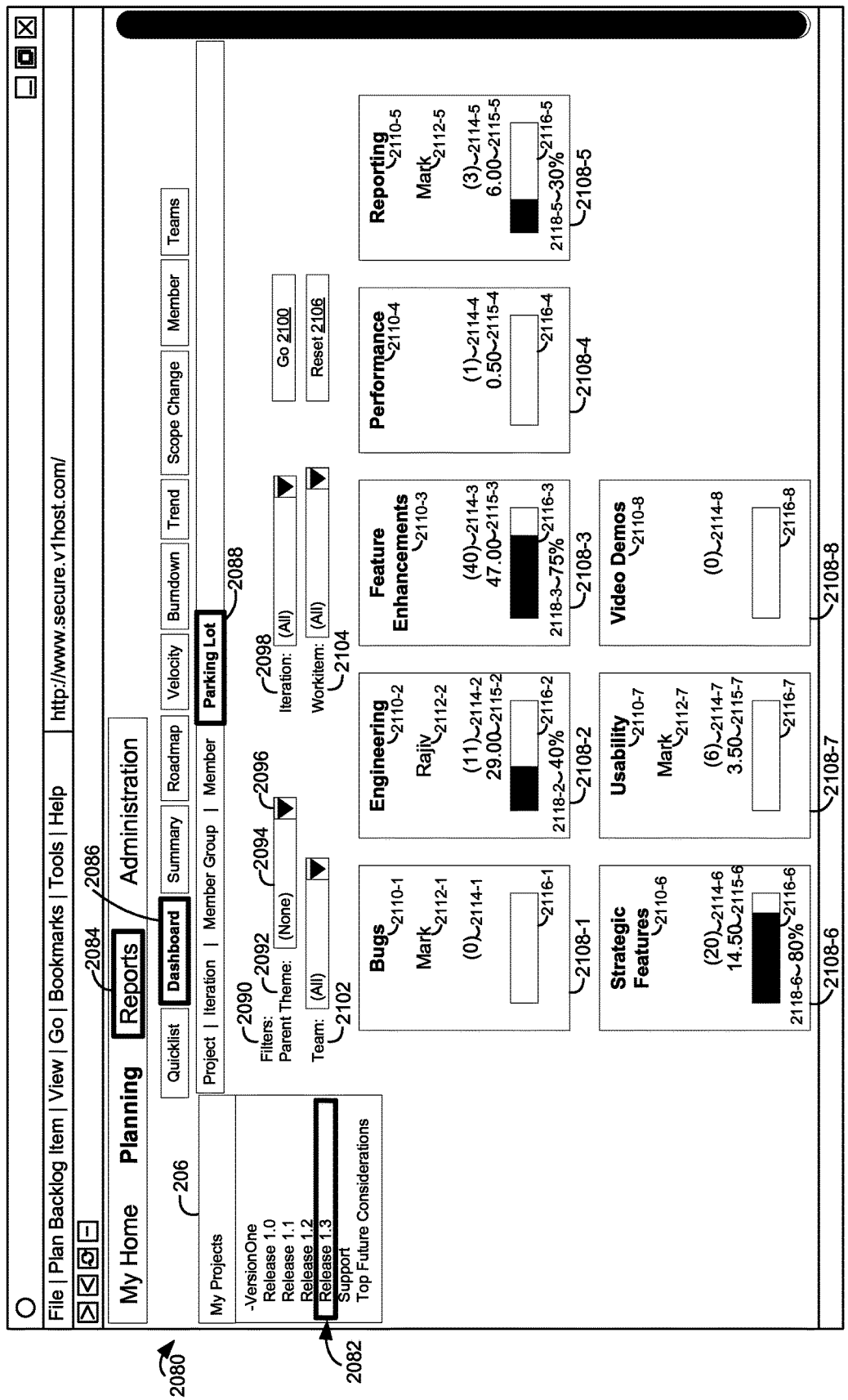
FIG. 2K is a schematic screenshot of a user interface displaying a parking lot report in accordance with some embodiments.

FIG. 2K is a schematic screenshot of a user interface 2080 for displaying a parking lot report in accordance with some embodiments. The UI 2080 may be accessed, for example, by selecting one or more links, icons or tabs (e.g., "reports" link 2084, "dashboard" tab 2086, and "parking lot" tab 2088). In some embodiments, data presented in the parking lot report of UI 2080 is filtered according to a particular project hierarchy node (e.g., node 2082, "Release 1.3"). In some embodiments, the presented data may be filtered according to one or more additional filter criteria 2090, such as "parent theme" 2092, iteration 2098, team 2102, and workitem 2104. In some embodiments, the filter criteria may include any available attributes. In some embodiments, values for the filter criteria may be entered directly into user input fields (e.g., 2094). In some embodiments, values for the filter criteria may be selected through drop-down menus (e.g., 2096). Selecting the "go" button 2100 results in display of a parking lot report generated in accordance with the specified filter criteria: only data for assets that fall within the specified filter criteria are displayed. Selecting the "reset" button 2106 restores the filter criteria to default values (e.g., "all" for team 2102 and "none" for parent theme 2092).

The parking lot report displays blocks 2108 corresponding to respective groups of assets that satisfy the filter criteria. In some embodiments, a respective block 2108 displays a title 2110 of the respective group of assets and a graphic 2116 showing a degree of completion of assets within the group. For example, if the group is a feature set, the graphic 2116 shows a degree of completion of features within the feature set. The graphic 2116 is shown as a bar chart; in other embodiments another graphic showing a degree of completion may be displayed, such as a gauge or line chart. In the example of UI 2080, the bar charts 2116 indicate that the "Engineering" group of block 2108-2 is 40% complete, the "Feature Enhancements" group of block 2108-3 is 75% complete, the "Performance" group of block 2108-4 is 0% complete, the "Strategic Features" group of block 2108-6 is 80% complete, and the "Usability" group of block 2108-7 is 0% complete.

In some embodiments, a completion percentage 2118 is shown along with or in place of the graphic 2116.

In some embodiments, additional information regarding a respective group is displayed in the respective block 2108, such as an owner 2112, a number of assets 2114 in the group, and a count of work units 2115 (e.g., an estimate of man-hours).

In some embodiments, in addition to or instead of displaying the graphic 2116 or the completion percentage 2118, each block 2108 is displayed with a background color corresponding to a degree of completion of the respective group of assets. For example, the block 2108 of a group that is 100% complete may be displayed in green, the block 2108 of a group that is 0% complete may be displayed in red, and blocks 2108 of groups that are partially complete may be displayed in other colors corresponding to ranges of completion percentages. In some embodiments, each block 2108 is displayed with a background color corresponding to a comparison of the degree of completion to a schedule (e.g., a comparison of the degree of completion to a planned degree of completion for the group at the time when the report is generated). For example, the block 2108 of a group that is on schedule may be displayed in green, the block 2108 of a group that is slightly behind schedule may be displayed in yellow, and the block 2108 of a group that is significantly behind schedule may be displayed in red. In some embodiments, a group is on schedule if its degree of completion equals or exceeds the planned degree of completion, a group is slightly behind schedule if its degree of completion is less than the planned degree of completion by no more than a specified amount, and a group is significantly behind schedule if its degree of completion is less than the planned degree of completion by more than the specified amount.

Because a user interface for specifying filter criteria is implemented into the parking lot report UI 2080, the UI 2080 enables on-the-fly generation of customized parking lot reports. A user may view a parking lot report for a particular project and then drill down on the report by generating subsequent parking lot reports filtered by user-specified attributes. For example, the user may generate parking lot reports for particular teams, releases, iterations, and/or parent themes within the project. Multiple parking lot reports with distinct filter criteria may be generated in quick succession. The user also may quickly and easily generate successive parking lot reports for different projects. For example, a manager may use the UI 2080 to review the status of multiple projects by successively selecting various projects in the project selection window 206.

Attention is now directed to methods for managing agile software development.

Figure 3A:
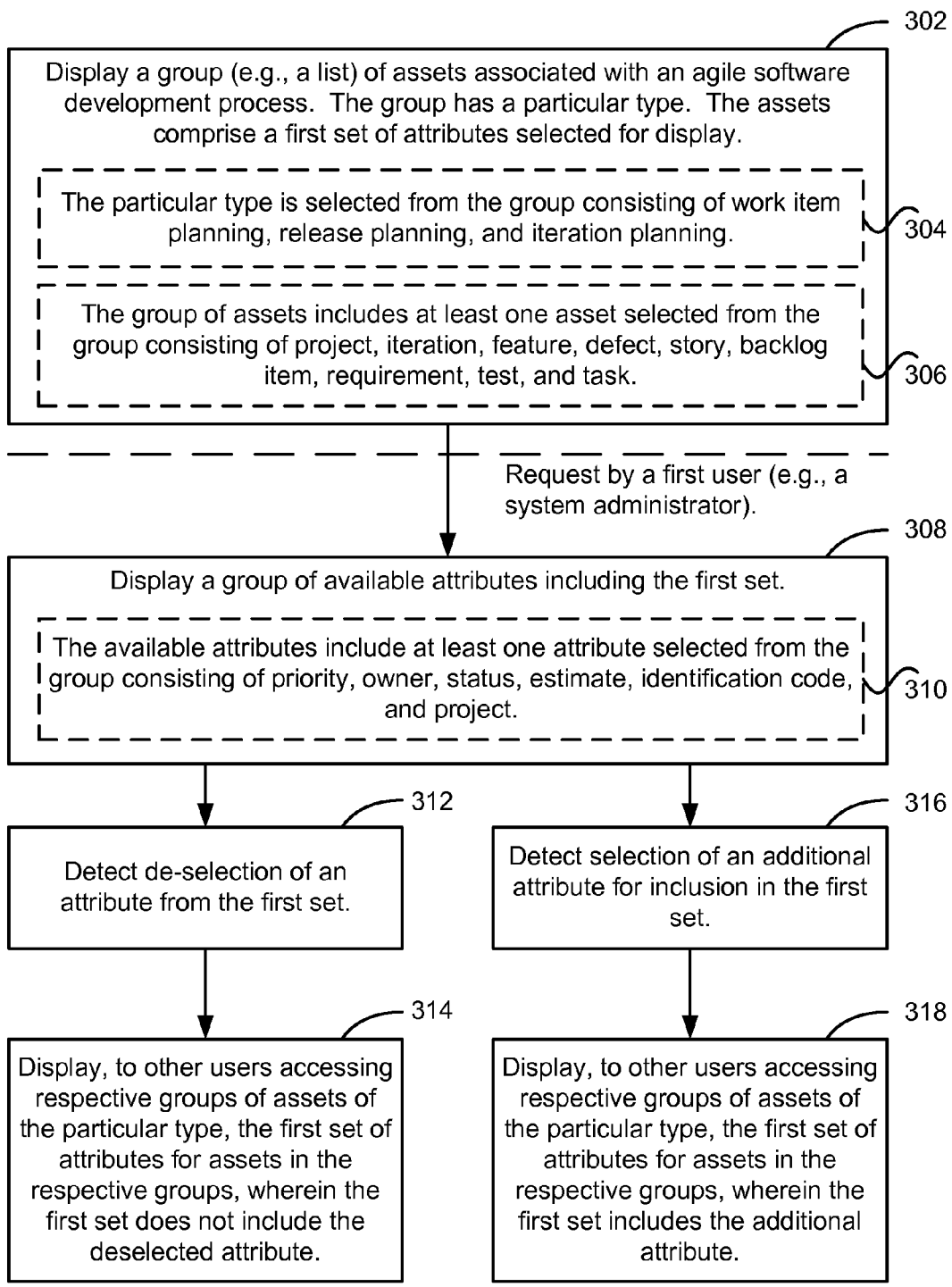
FIGS. 3A-3D are flow diagrams illustrating methods of managing agile software development in accordance with some embodiments.

FIG. 3A is a flow diagram illustrating a method 300 for managing agile software development in accordance with some embodiments. In the method 300, a group of assets associated with an agile software development process is displayed (302). The group has a particular type and the assets include a first set of attributes selected for display. For example, the first set of attributes for the assets displayed in user interface 200 (FIG. 2A) includes attributes 212, 214, 216, 218, 220, 222, and 224.

In some embodiments, the particular type is selected from the group consisting of work item planning, release planning, and iteration planning (304). A user may select the particular type by, for example, selecting a tab (e.g., "work item planning" tab 202, FIG. 2A), selecting a type from a drop-down menu, or using similar well-known methods of selection for graphical user interfaces.

In some embodiments, the group of assets includes at least one asset selected from the group consisting of project, iteration, feature, defect, story, backlog item, requirement, test, and task (306). For example, the group may include one or more features and one or more defects, as shown for group 201 (FIG. 2A).

In some embodiments, the group of assets is a list, as shown for group 201 (FIG. 2A).

While the group of assets is being displayed, a request by a first user is detected, as shown in FIG. 3A. In some embodiments, the first user is a system administrator or other user with privileges to create a customized default setting. In response to detecting the request by the first user, a group of available attributes is displayed (308), including the first set. In some embodiments, the available attributes include at least one attribute selected from the group consisting of priority, owner, status, estimate (e.g., work or size estimate), identification code, and project (310). For example, the customization user interface 240 shows a group of available attributes 242 (FIG. 2B). In the customization user interface 240, assets in the first set are indicated by check marks in corresponding display selection boxes (e.g., 244).

De-selection of an attribute from the first set is detected (312). For example, clicking on the display selection box 244 for the "project" attribute 224 in the customization user interface 240 results in de-selection of the "project" attribute 224 from the first set, as illustrated in FIG. 2C.

For other users subsequently accessing respective groups of assets of the particular type, the first set of attributes is displayed (314) for assets in the respective groups, wherein the first set does not include the deselected attribute. For example, after de-selection of the "project" attribute 224, a user accessing a "work item planning" group 270 (FIG. 2D) will not be shown the "project" attribute.

In addition to or instead of detecting de-selection of an attribute from the first set, selection of an additional attribute for inclusion in the first set is detected (316). For exampling, clicking on the display selection box 246 for the "attachment count" attribute 248 (FIG. 2B) results in selection of the "attachment count" attribute 248 for inclusion in the first set.

For other users subsequently accessing respective groups of assets of the particular type, the first set of attributes is displayed (318) for assets in the respective groups, wherein the first set includes the additional attribute. For example, after selection of the "attachment count" attribute 248, a user accessing a "work item planning" group will be shown the "attachment count" attribute.

The method 300 thus enables creation of default customized settings, such as system defaults, for viewing groups of assets. While the method 300 includes a number of operations that appear to occur in a specific order, it should be apparent that the method 300 can include more or fewer operations, which can be executed serially or in parallel. An order of two or more operations may be changed and two or more operations may be combined into a single operation. For example, while operations 312-314 and 316-318 are shown as occurring in parallel, either operations 312-314 or 316-318 may be omitted. Alternately, operations 312 and 316 may both be performed prior to operations 314 and 318, which subsequently are performed in a single operation. Other variations are possible.

Figure 3B:
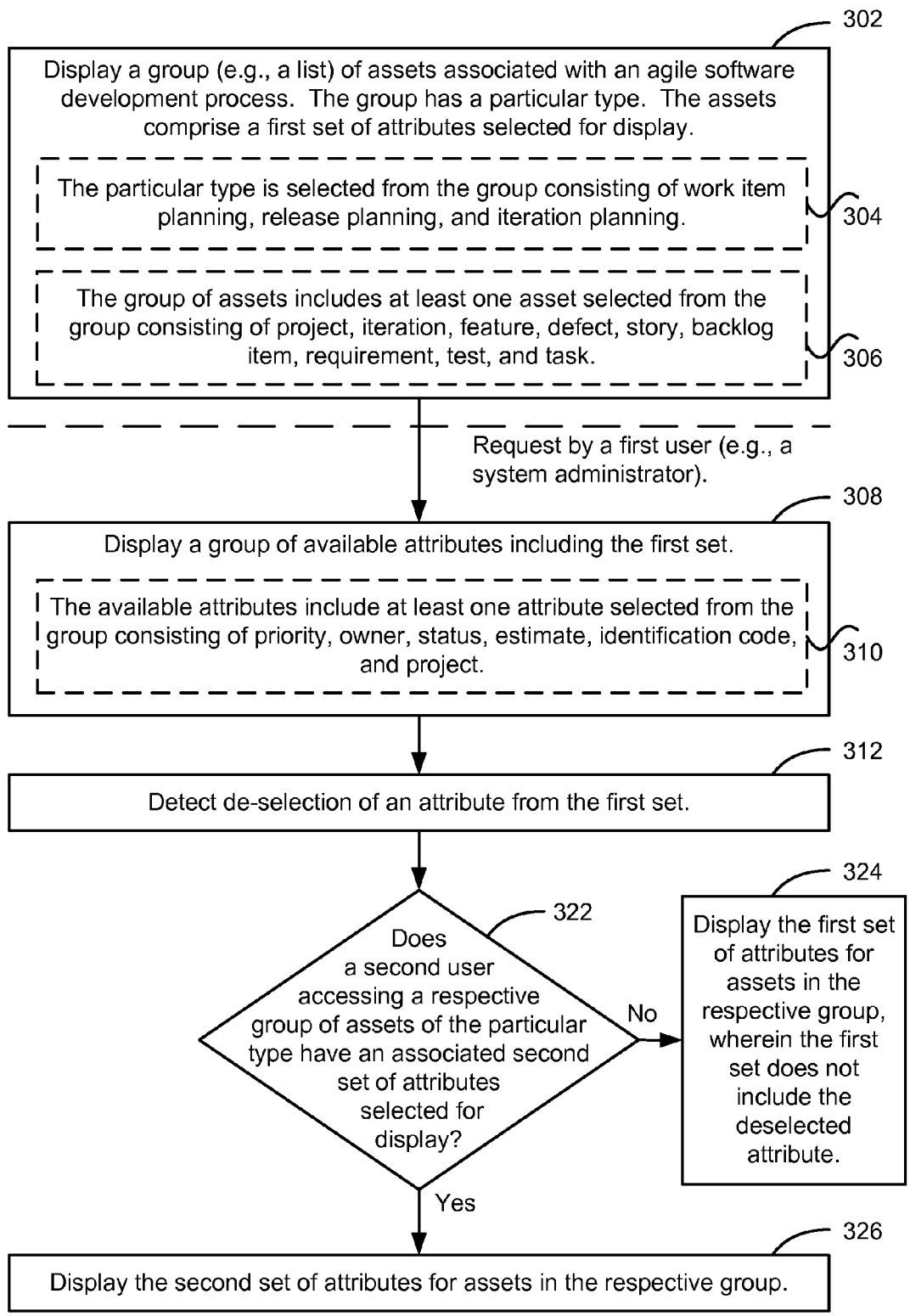

FIG. 3B is a flow diagram illustrating a method 320 for managing agile software development in accordance with some embodiments. In the method 320, operations 302-312 are performed as described above for method 300.

When a second user accesses a respective group of assets of the same type as the group displayed in operation 302, a determination is made (322) as to whether the second user has an associated second set of attributes selected for display. If the user does not have an associated second set (322—No), the first set of attributes is displayed (324) for assets in the respective group, wherein the first set does not include the deselected attribute. If the user has an associated second set (322—Yes), the second set of attributes is displayed (326) for assets in the respective group.

In a variant of the method 320, selection of an additional attribute for inclusion in the first set is detected (316). When the second user subsequently accesses the respective group of assets of the same type as the group displayed in operation 302, the determination is made (322) as to whether the second user has an associated second set of attributes selected for display. If the second user does not have an associated second set, the first set of attributes is displayed for assets in the respective groups, wherein the first set includes the additional attribute. If the user has an associated second set, the second set of attributes is displayed for assets in the respective group.

The method 320 thus allows users either to use default customized settings or to create personalized settings that override the default.

Figure 3C:
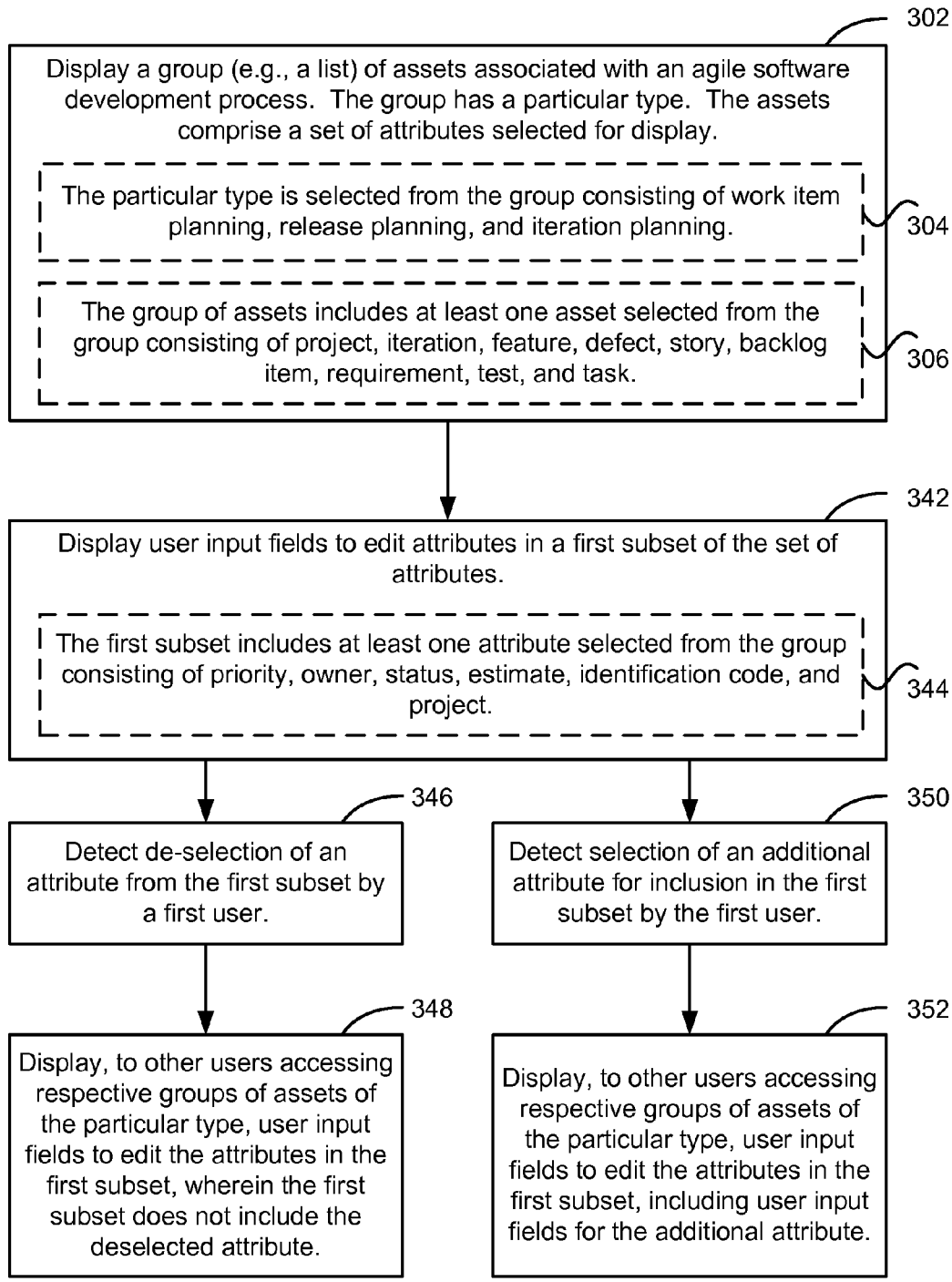

FIG. 3C is a flow diagram illustrating a method 340 for managing agile software development in accordance with some embodiments. In the method 340, a group of assets associated with an agile software development process is displayed (302). The group has a particular type and the assets include a first set of attributes selected for display. In some embodiments, the particular type is selected from the group consisting of work item planning, release planning, and iteration planning (304). In some embodiments, the group of assets includes at least one asset selected from the group consisting of project, iteration, feature, defect, story, backlog item, requirement, test, and task (306). Operations 302, 304, and 306 are described in more detail above with regard to method 300 (FIG. 3A).

User input fields to edit attributes in a first subset of the set of attributes are displayed (342). For example, user input fields (e.g., 228 and 230) corresponding to attributes "priority" 220 and "estimate" 230 are displayed in user interface 200 (FIG. 2A). In some embodiments, the first subset includes at least one attribute selected from the group consisting of priority, owner, status, estimate (e.g., work or size estimate), identification code, and project (344).

De-selection of an attribute from the first subset by a first user is detected (346). For example, clicking on the editing selection box 252 for the "priority" attribute 220 in the customization user interface 240 (FIG. 2B) would result in de-selection of the "priority" attribute 220 from the first subset.

For other users subsequently accessing respective groups of assets of the particular type, user input fields to edit the attributes in the first subset are displayed (348), wherein the first subset does not include the deselected attribute. For example, after de-selection of the "priority" attribute 220, a user accessing a "work item planning" group will not be shown a user input field for the "priority" attribute.

In addition to or instead of detecting de-selection of an attribute from the first subset, selection of an additional attribute by the first user for inclusion in the first subset is detected (350). For exampling, clicking on the editing selection box 250 for the "status" attribute 218 (FIG. 2B) would result in selection of the "status" attribute 218 for inclusion in the first subset.

For other users subsequently accessing respective groups of assets of the particular type, user input fields to edit the attributes in the first subset are displayed (352), including user input fields for the additional attribute. For example, after selection of the "status" attribute 218, a user accessing a "work item planning" group will be shown user input fields to edit the "status" attribute.

The method 340 thus enables creation of default customized settings, such as system defaults, to enable editing of specified attributes. While the method 340 includes a number of operations that appear to occur in a specific order, it should be apparent that the method 340 can include more or fewer operations, which can be executed serially or in parallel. An order of two or more operations may be changed and two or more operations may be combined into a single operation. For example, while operations 346-348 and 350-352 are shown as occurring in parallel, either operations 346-348 or 350-352 may be omitted. Alternately, operations 346 and 350 may both be performed prior to operations 348 and 352, which subsequently are performed in a single operation. Other variations are possible.

Figure 3D:
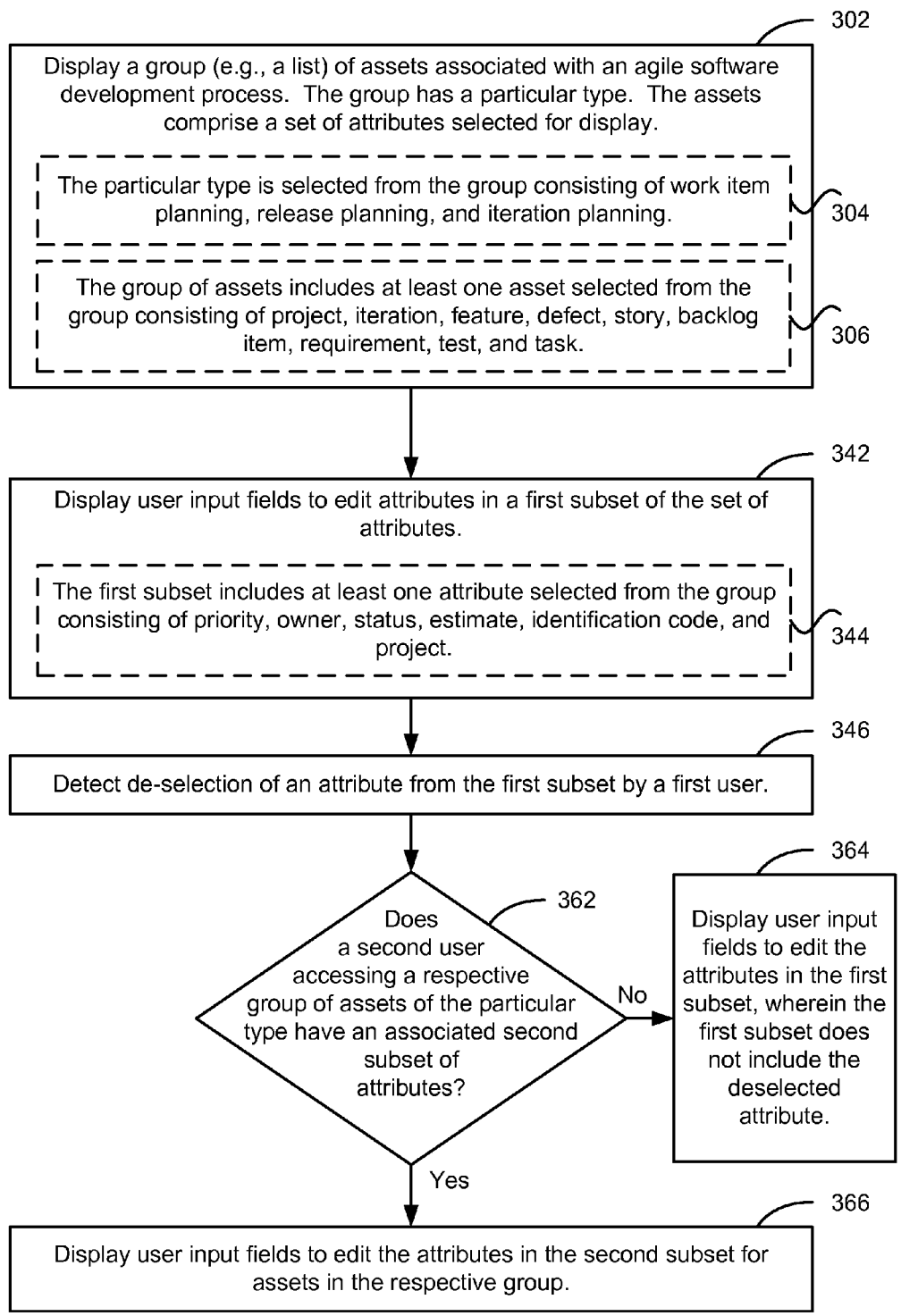

FIG. 3D is a flow diagram illustrating a method 360 for managing agile software development in accordance with some embodiments. In the method 360, operations 302-346 are performed as described above for method 340.

When a second user accesses a respective group of assets of the same type as the group displayed in operation 302, a determination is made (362) as to whether the second user has an associated second subset of attributes. If the second user does not have an associated second subset (362—No), user input fields are displayed (364) to edit the attributes in the first subset, wherein the first subset does not include the deselected attribute. If the second user has an associated second subset (362—Yes), user input fields are displayed (366) to edit the attributes in the second subset for assets in the respective group.

In a variant of the method 360, selection of an additional attribute by the first user for inclusion in the first subset is detected (350). When the second user subsequently accesses the respective group of assets of the same type as the group displayed in operation 302, the determination is made (362) as to whether the second user has an associated second subset of attributes. If the second user does not have an associated second subset, user input fields are displayed to edit the attributes in the first subset, including user input fields for the additional attribute. If the second user has an associated second subset, user input fields are displayed to edit the attributes in the second subset for assets in the respective group.

The method 360 thus enables editing of specified attributes in accordance with either default customized settings or personalized settings.

Figure 3E:
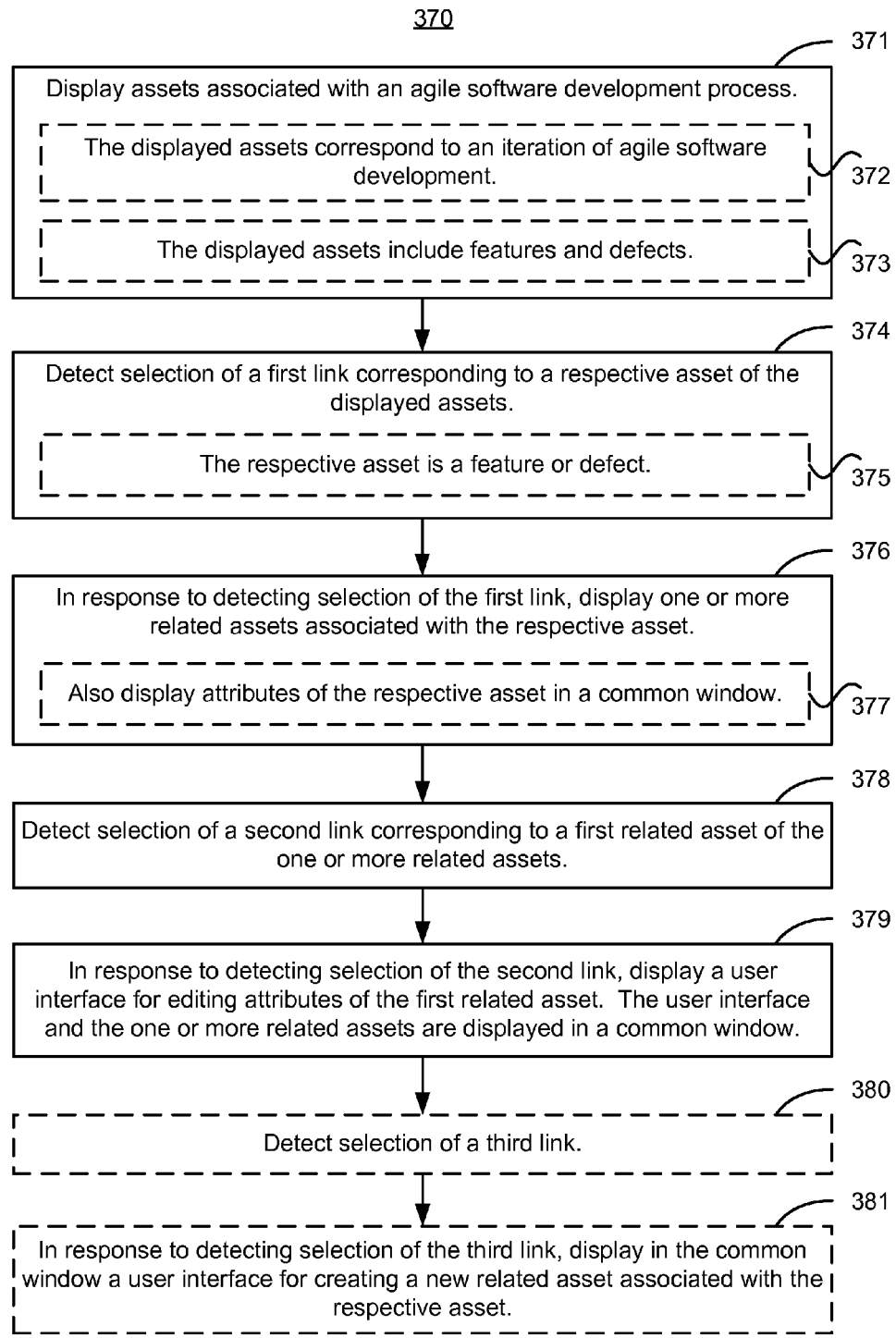
FIG. 3E is a flow diagram illustrating a method of presenting and enabling editing of project management data for agile software development in accordance with some embodiments.

FIG. 3E is a flow diagram illustrating a method 370 of presenting and enabling editing of project management data for agile software development in accordance with some embodiments. In some embodiments, the method 370 is performed at a client system 402 (FIG. 4, below) by executing a set of instructions corresponding to the method 370. In the method 370, assets associated with an agile software development process are displayed (371). In some embodiments, the displayed assets (e.g., group 262, FIG. 2E) correspond (372) to an iteration (e.g., 255) of agile software development. In some embodiments, the displayed assets include (373) features (e.g., 264) and defects (e.g., 265).

Selection of a first link corresponding to a respective asset of the displayed assets is detected (374). For example, selection of an "edit" link 236 (FIG. 2A) or a "plan backlog item" link 271 (FIG. 2E) is detected. In some embodiments, the respective asset is a feature or defect (375).

In response to detecting selection of the first link, one or more related assets associated with the respective asset are displayed (376). For example, in response to detection of the "plan backlog item" link 271 for the "enter RMA" asset 264 (FIG. 2E), related assets 273 (FIG. 2F) associated with the "enter RMA" asset 264 are displayed. In some embodiments, the related assets include tasks or tests.

In some embodiments, attributes of the respective asset are displayed (377) in a common window with the related assets. For example, attributes 272 of the "enter RMA" asset 264 are displayed along with the related assets 273 in the window 290 (FIG. 2F).

Selection of a second link (e.g., "edit" link 277, FIG. 2F) corresponding to a first related asset (e.g., 274) of the one or more related assets is detected (378).

In response to detecting selection of the second link, a user interface (e.g., 278, FIG. 2G) for editing attributes of the first related asset is displayed (379). The user interface and the one or more related assets are displayed in a common window (e.g., 290, FIG. 2G). In some embodiments, the attributes of the first related asset include at least one of a title, an owner, an estimate (e.g., a work or size estimate), and an identification code. The displayed user interface for editing attributes may receive user input to edit a value of an attribute (e.g., through user input field 279, 281, 283, or 284, FIG. 2G), in response to which the value of the attribute is updated.

In some embodiments, selection of a third link (e.g., "add task" 275 or "add test" 276) is detected (380). In response, a user interface for creating a new related asset associated with the respective asset is displayed (381) in the common window. For example, a user interface analogous to UI 278 (FIG. 2G) is displayed, with the user input fields blank.

The method 370 provides a user-friendly process for viewing an asset's attributes and related assets and for editing or creating related assets in a single integrated interface. The user can perform these tasks without having to browse through a succession of windows.

Figure 3F:
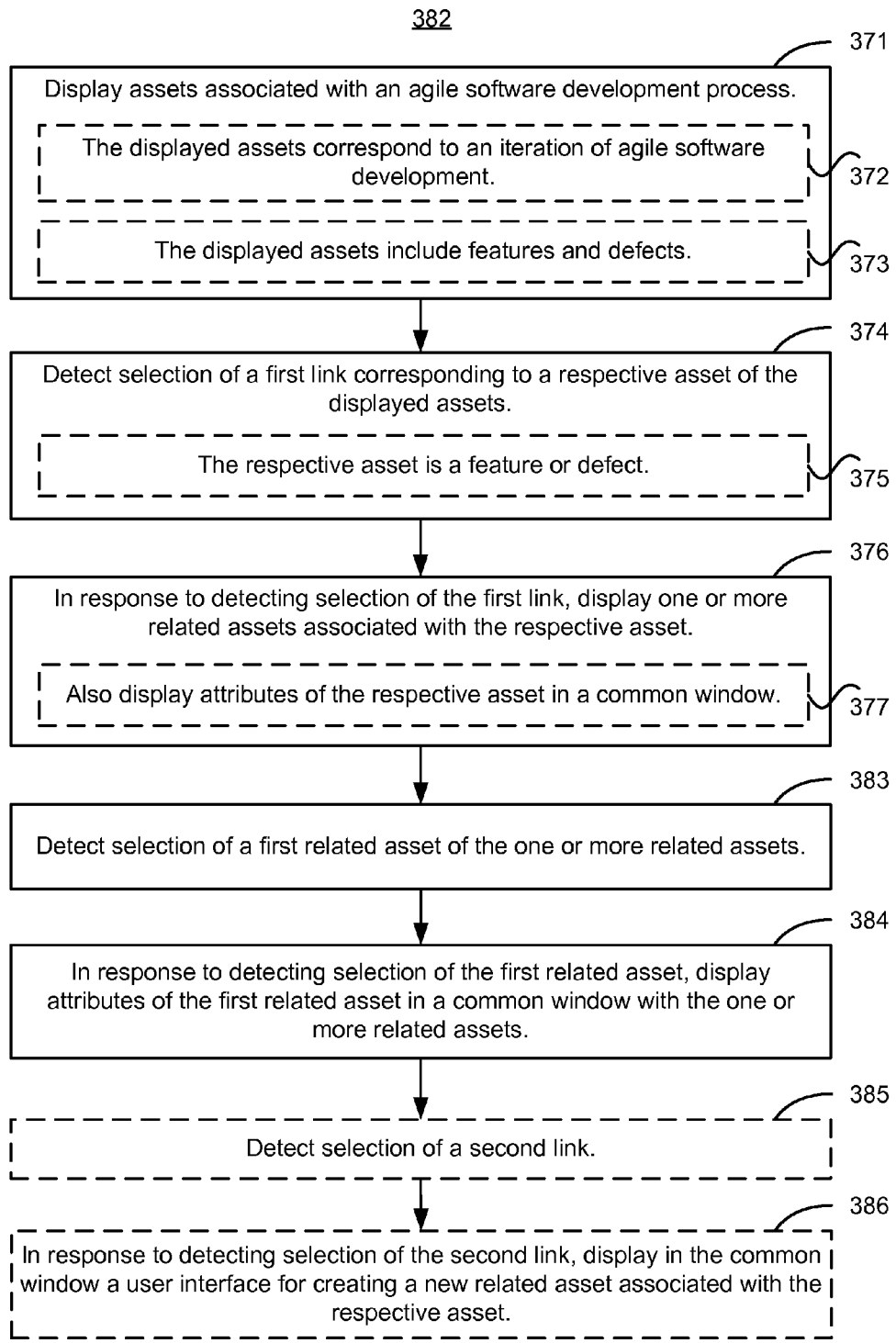
FIG. 3F is a flow diagram illustrating a method of presenting project management data for agile software development in accordance with some embodiments.

FIG. 3F is a flow diagram illustrating a method 382 for presenting project management data for agile software development in accordance with some embodiments. In some embodiments, the method 382 is performed at a client system 402 (FIG. 4, below) by executing a set of instructions corresponding to the method 382. In the method 382, operations 371-377 are performed as described above with regard to method 370 (FIG. 3E). Selection of a first related asset of the one or more related assets is then detected (383). In some embodiments, the first related asset is selected by clicking on an "edit" link 277 (FIG. 2F) associated with the first related asset, on the title 212 of the first related asset, or anywhere in a row displaying attributes of the first related asset.

In response to detecting selection of the first related asset, attributes of the first related asset are displayed (384) in a common window with the one or more related assets. For example, attributes of the asset 274 are displayed in user input fields 279, 281, 283, and 284 in UI 278 (FIG. 2G).

In some embodiments, selection of a second link (e.g., "add task" 275 or "add test" 276) is detected (385). In response, a user interface for creating a new related asset associated with the respective asset is displayed (386) in the common window. For example, a user interface analogous to UI 278 (FIG. 2G) is displayed, with the user input fields blank.

The method 382 provides a user-friendly process for viewing multiple levels of information regarding an asset, including the asset's attributes and related assets, as well as attributes of the related assets. The user can view this information without having to browse through a succession of windows.

Figure 3G:
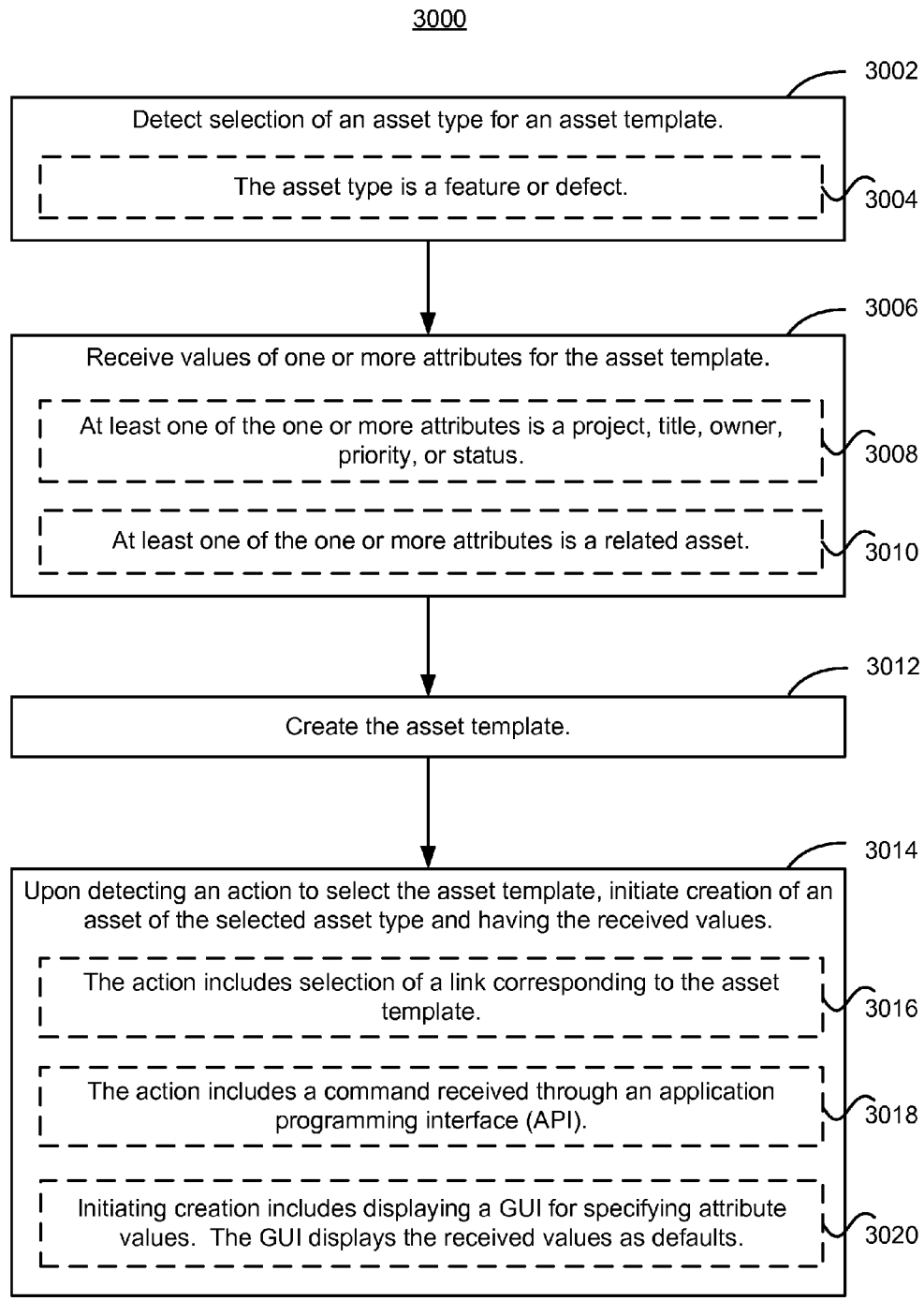
FIG. 3G is a flow diagram illustrating a method of creating assets for use in tracking agile software development in accordance with some embodiments.

FIG. 3G is a flow diagram illustrating a method 3000 of creating assets for use in tracking agile software development in accordance with some embodiments. In some embodiments, the method 3000 is performed at a client system 402 (FIG. 4, below) by executing a set of instructions corresponding to the method 3000. In some embodiments, the method 3000 corresponds to a set of instructions executed by a server system 404 (FIG. 4, below) in communication with a client system 402. In the method 3000, selection of an asset type for an asset template is detected (3002). In some embodiments, the asset type is a feature (e.g., a backlog item) or a defect (3004). For example, detecting selection of the "add backlog item template" link 2014 (FIG. 2H) selects "backlog item" as the asset type for a template, while detecting selection of the "add defect template" link 2016 selects "defect" as the asset type for a template.

Values of one or more attributes (e.g., project "Call Center" 2022, owner "Jeff" 2038, and "High" priority 2020, FIG. 2J) for the asset template are received (3006). In some embodiments, at least one of the one or more attributes is a project, title, owner, priority, or status (3008). In some embodiments, at least one of the one or more attributes is a related asset (3010) (e.g., task 2040, FIG. 2I).

The asset template is created (3012). For example, in response to detecting selection of the "save template" icon 2054 (FIG. 2J), the "My High Priority Defects" template 2026 is created.

Upon detecting an action to select the asset template, creation is initiated (3014) of an asset of the selected asset type and having the received values. In some embodiments, the action includes (3016) selection of a link (e.g., "generate defect" 2024, FIG. 2H) corresponding to the asset template. In some embodiments, the action includes a command received (3018) through an application programming interface (API).

In some embodiments, initiating creation of the asset includes displaying (3020) a GUI for specifying attribute values (e.g., UI 2050, FIG. 2J). The GUI displays the received values as defaults (e.g., project "Call Center" 2022, owner "Jeff" 2038, and "High" priority 2020, FIG. 2J). In some embodiments, the user may edit the default values. In some embodiments, creation of the asset is completed upon detection of another action (e.g., selection of "save new defect" button 2052, FIG. 2J).

Alternatively, in some embodiments, upon detecting the action to select the asset template, the asset is created without displaying a GUI for specifying attribute values.

Asset templates created in accordance with the method 3000 provide a simple and convenient way to create new assets without repeatedly entering common attribute values. In some embodiments, the asset templates also enable the automatic creation of related assets. Operation 3014 may be performed repeatedly to create multiple assets from the same asset template.

Figure 3H:
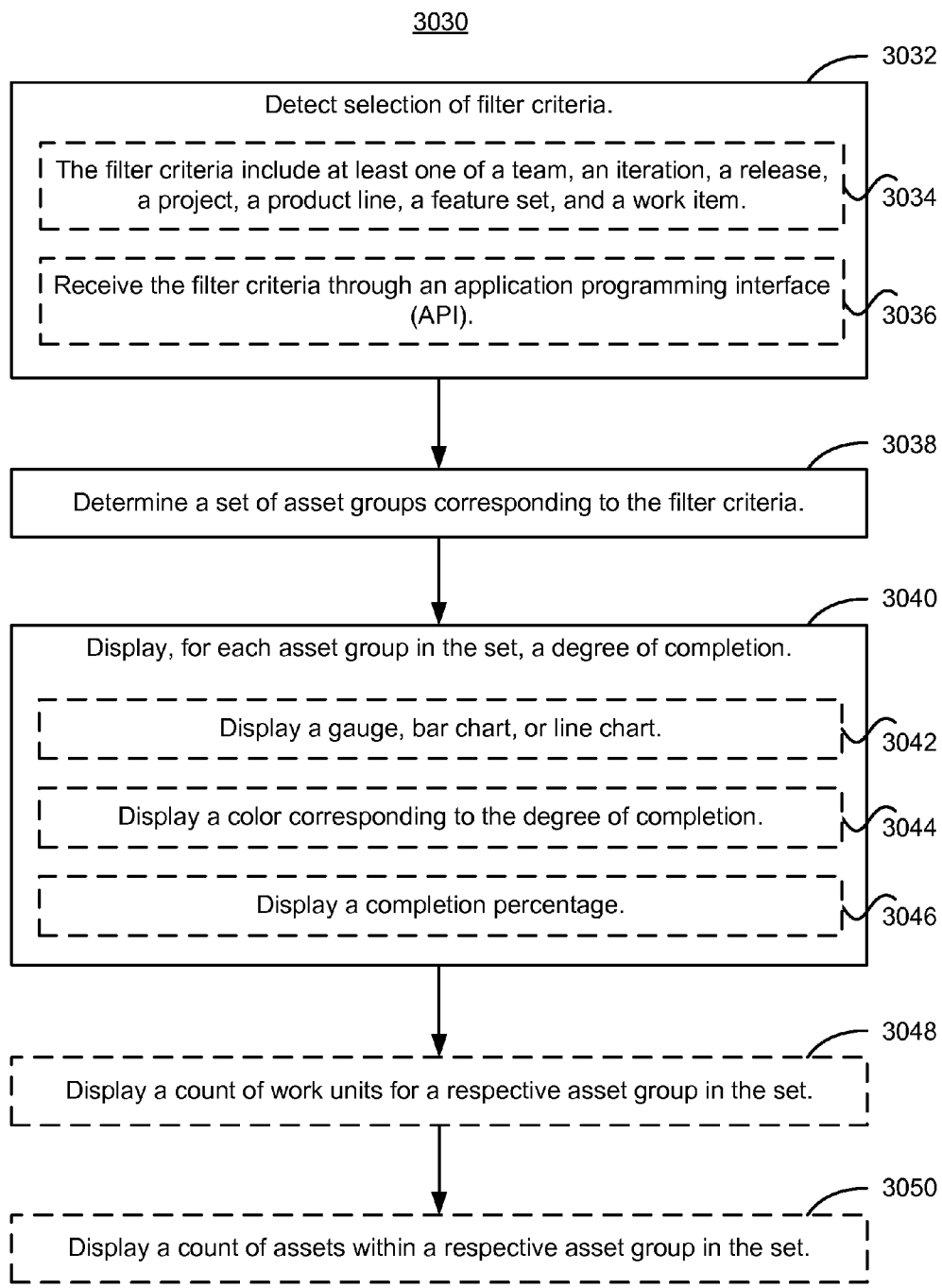
FIG. 3H is a flow diagram illustrating a method of generating customized reports for tracking agile software development in accordance with some embodiments.

FIG. 3H is a flow diagram illustrating a method 3030 of generating customized reports for tracking agile software development in accordance with some embodiments. In some embodiments, the method 3030 is performed at a client system 402 (FIG. 4, below) by executing a set of instructions corresponding to the method 3030. In the method 3030, selection of filter criteria is detected (3032). For example, a system may detect selection of a particular project hierarchy node (e.g., 2082, FIG. 2K) via the project selection window 206 or selection of filter criteria 2090 via user input fields (e.g., 2094, FIG. 2K) and drop-down menus (e.g., 2096, FIG. 2K).

In some embodiments, filter criteria include (3034) at least one of a team, an iteration, a release, a project, a product line, a feature set, and a work item. In some embodiments, the filter criteria are received (3036) through an API.

A set of asset groups corresponding to the filter criteria is determined (3038). For each asset group in the set, a degree of completion is displayed (3040). In some embodiments, the degree of completion is displayed (3042) in a bar chart (e.g., 2116, FIG. 2K), gauge, or line chart. In some embodiments, a color (e.g., a background color of a block 2108) corresponding to the degree of completion is displayed (3044). In some embodiments, a completion percentage (e.g., 2118, FIG. 2K) is displayed (3046).

In some embodiments, a count of work units (e.g., 2115, FIG. 2K) is displayed (3048) for a respective asset group in the set. In some embodiments, a count of assets (e.g., 2114, FIG. 2K) within a respective asset group in the set is displayed (3050).

The method 3030 provides a user-friendly method of generating customized parking lot reports on the fly. The method 3030 may be performed repeatedly with distinct filter criteria to generate multiple distinct parking lot reports, such as multiple parking lot reports for distinct project hierarchy nodes or multiple parking lot reports filtered by various attributes at a given project hierarchy node.

Figure 4:
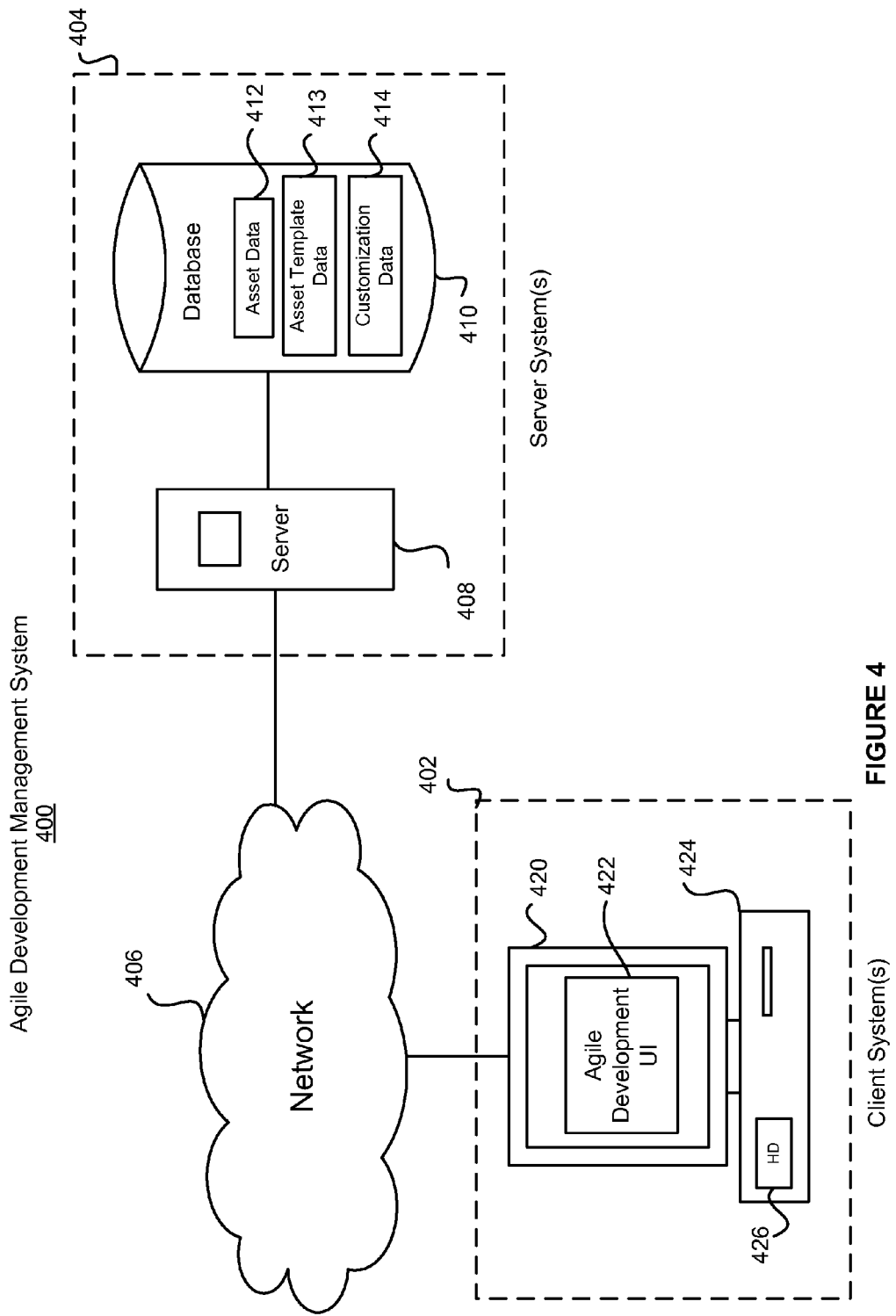
FIG. 4 is a block diagram illustrating an agile development management system in accordance with some embodiments.

FIG. 4 is a block diagram illustrating an agile development management system 400 in accordance with some embodiments. The agile development management system 400 includes a server system 404 coupled to one or more client systems 402 by a network 406. The client systems 402 may include client systems associated with respective users such as software developers, testers, managers, clients, customers, vendors, and any other parties involved in agile software development. The network 406 may be any suitable wired and/or wireless network and may include a local area network (LAN), wide area network (WAN), virtual private network (VPN), the Internet, metropolitan area network (MAN), or any combination of such networks.

The server system 404 includes a server 408 and a database 410. Server 408 serves as a front-end for the server system 404. Server 408, sometimes called a front end server, provides an interface between the server system 404 and the client systems 402. In some embodiments, the functions of server 408 may be divided or allocated among two or more servers.

Figure 7A:
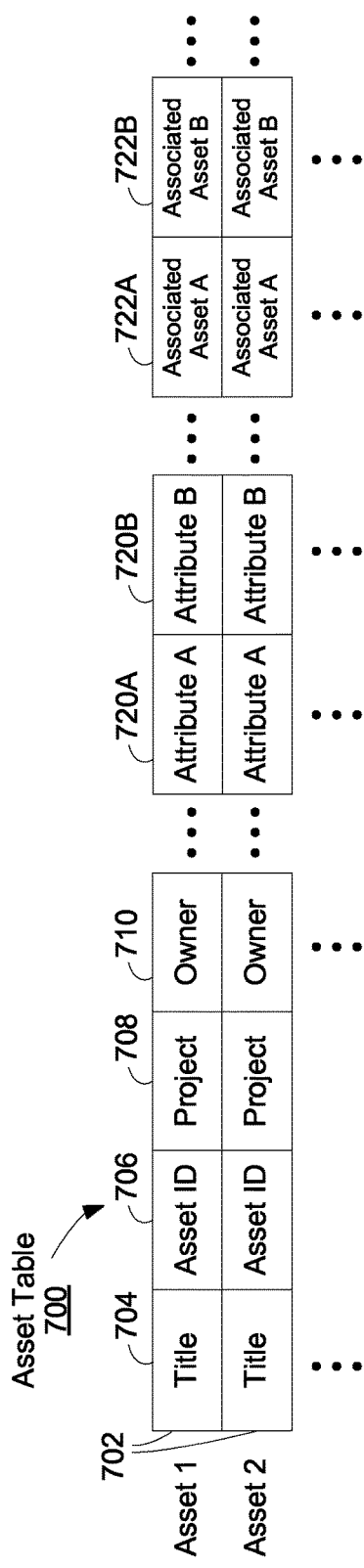
FIGS. 7A-7C are diagrams illustrating data structures for assets, customized settings, and asset templates in accordance with some embodiments.
Figure 7B:
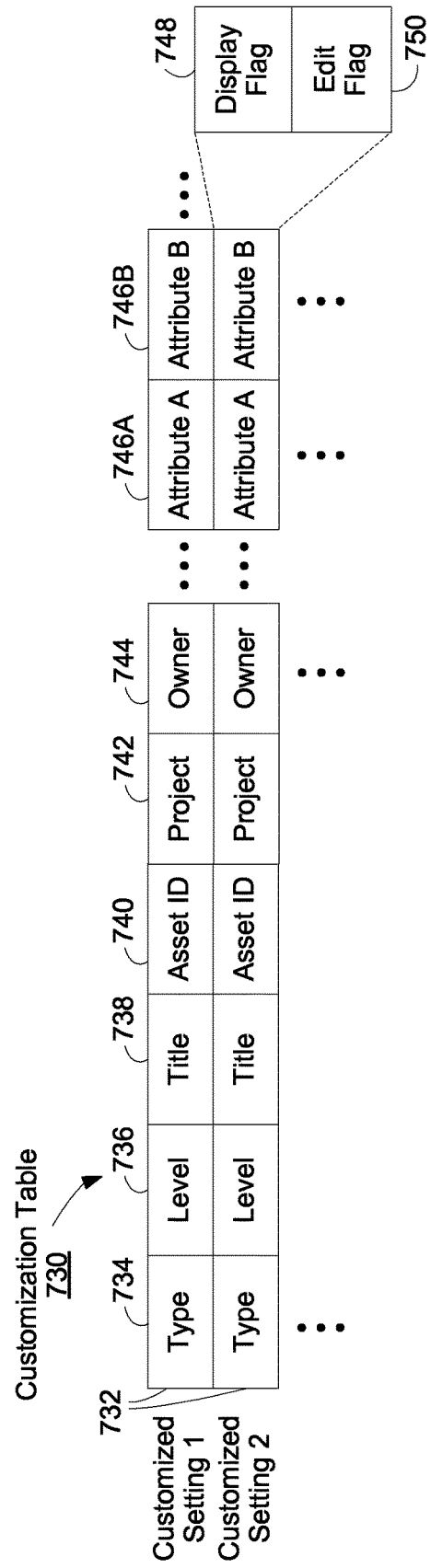
Figure 7C:
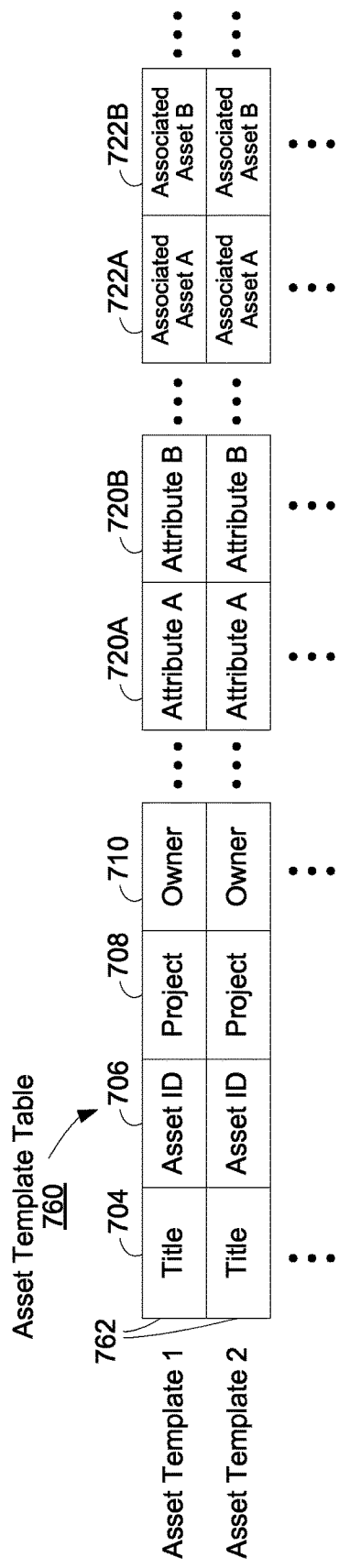

The server system 404 stores data relating to the agile development process, including asset data 412, asset template data 413, and customization data 414. Asset data 412 includes attributes for respective assets. An exemplary data structure 700 for asset data 412 is illustrated in FIG. 7A, described below. Asset template data 413 includes attributes for respective asset templates. An exemplary data structure 760 for asset template data 413 is illustrated in FIG. 7C, described below. Customization data 414 includes the level of the customization (e.g. system default or personalized), the type of asset group to which the customization applies, and data indicating which available assets are selected for display and for editing via user input fields. An exemplary data structure 730 for customization data 414 is illustrated in FIG. 7B, described below.

It should be appreciated that the server system 404, including the server 408 and the database 410, may be implemented as a distributed system of multiple computers. However, for convenience of explanation, the server system 404 is described herein as being implemented on a single computer, which can be considered a single logical system.

A user interfaces with the server system 404 at a client system or device 402 (hereinafter called the client system for ease of reference). The client system 402 includes a computer 424 or computer controlled device, such as a personal digital assistant (PDA), cellular telephone or the like. The computer 424 typically includes one or more processors (not shown); memory, which may include volatile memory (not shown) and non-volatile memory such as a hard disk drive 426; and a display 420. The computer 424 may also have input devices such as a keyboard and a mouse (not shown).

In some embodiments, a user may interact with the server system 404 via an agile development user interface 422 presented on the display 420. Examples of user interfaces 422 are illustrated in FIGS. 2A-2K.

In some embodiments, the agile development user interface 422 may be a web-based user interface. That is, the user interface 422 includes one or more web pages. It is noted that a single web page can contain multiple frames, each of which may appear (when displayed by a browser application) to be a distinct web page. The web page(s) may be written in the Hypertext Markup Language (HTML), Extensible Markup Language (XML), or any other suitable language for preparing web pages, and may include one or more scripts for interfacing with the server system 404. For example, the web page(s) may include a JavaScript application that interfaces with the server system 404 via an application programming interface (API). The JavaScript application receives asset data, customization data, asset template data, and reporting data from the server system 404, manages the rendering of that data at the client, and also performs the client-side aspects of other tasks, such as marking attributes as selected or de-selected, updating attribute values according to data entered in user input fields, and transmitting user requests to the server system 404.

In some other embodiments, the agile development user interface 422 may be a part of a stand-alone application that is run on the client system 402. The standalone application may interface with the server system 404 via an application programming interface (API). Alternately, instead of using a client-sever model, the agile development management software may be installed and used on a single computer combining the functionalities of the server system 404 and client system 402.

Figure 5:
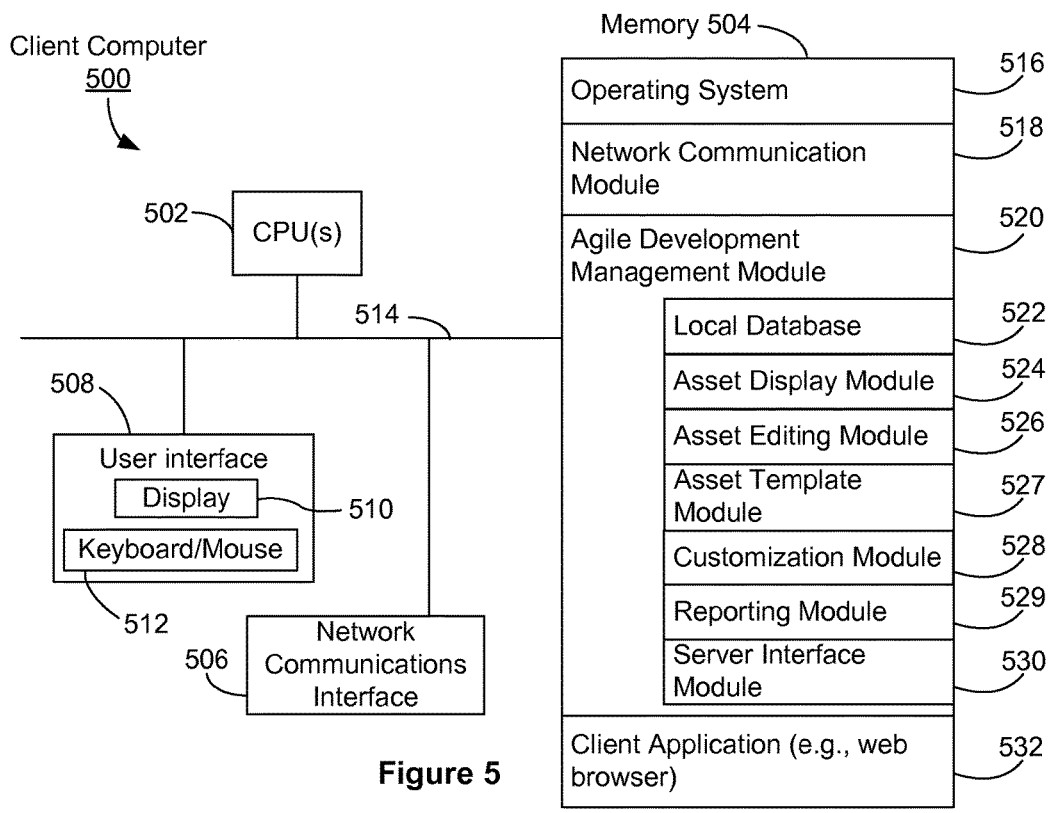
FIG. 5 is a block diagram illustrating a client computer in accordance with some embodiments.

FIG. 5 is a block diagram illustrating a client computer in accordance with some embodiments. The client computer 500, which may be used as a client system 402 (FIG. 4), typically includes one or more processing units (CPUs) 502, one or more network or other communications interfaces 506, memory 504, and one or more communication buses 514 for interconnecting these components. The communication buses 514 may include circuitry (sometimes called a chipset) that interconnects and controls communications between system components. The client computer 500 may also include a user interface 508 comprising a display device 510 and a keyboard and/or mouse (or other pointing device) 512. Memory 504 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 504 may optionally include one or more storage devices remotely located from the CPU(s) 502. In some embodiments, memory 504 stores the following programs, modules and data structures, or a subset thereof:

- an operating system 516 that includes procedures for handling various basic system services and for performing hardware dependent tasks;
- a network communication module 518 that is used for connecting the client system 500 to other computers via the one or more communication network interfaces 506 and one or more communication networks, such as the Internet, other wide area networks, local area networks, metropolitan area networks, and so on;
- an agile development management module 520 for handling data relating to the agile development process; and
- a client application 532, such as a web browser.

In some embodiments, the agile development management module 520 includes a local database 522 for storing data sent by the server (e.g., asset data, customization data, asset template data, and reporting data), an asset display module 524 for displaying groups of assets (e.g., via UI 200, FIG. 2A or UI 251, FIG. 2E) and for displaying an asset's attributes and related assets (e.g., via window 290, FIGS. 2F-2G), an asset editing module for updating attribute values (e.g., in accordance with data entered via user input fields), an asset template module 527 for creating, displaying, and editing templates and for creating assets from templates (e.g., via UIs 2002, 2030, and 2050, FIGS. 2H-2J), a customization module 528 for enabling creation of customized settings (e.g., via customization user interface 240, FIG. 2B), a reporting module 529 for displaying reporting (e.g., via UI 2080, FIG. 2K), and a server interface module 530 for interfacing with server computer 500. In some embodiments, the server interface module 530 includes a cache for storing data to be transmitted to the server.

In some embodiments, the agile development management module 520 may be a script-based module, embedded in a web page served from the server system 404 (FIG. 4). The web page may be rendered by a client application 532, such as a web browser, at the client computer 500. When the web page is rendered, the agile development management module 520 is executed, thereby providing a web-based interface to the server system 404. The script-based agile development management module may be written in JavaScript, AJAX, ECMAScript, Perl, or any other suitable scripting language.

In some other embodiments, the agile development management module 520 may be a standalone application stored in memory 504 of the client computer 500.

Each of the above identified elements in FIG. 5 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 504 may store a subset of the modules and data structures identified above. Furthermore, memory 504 may store additional modules and data structures not described above.

Figure 6:
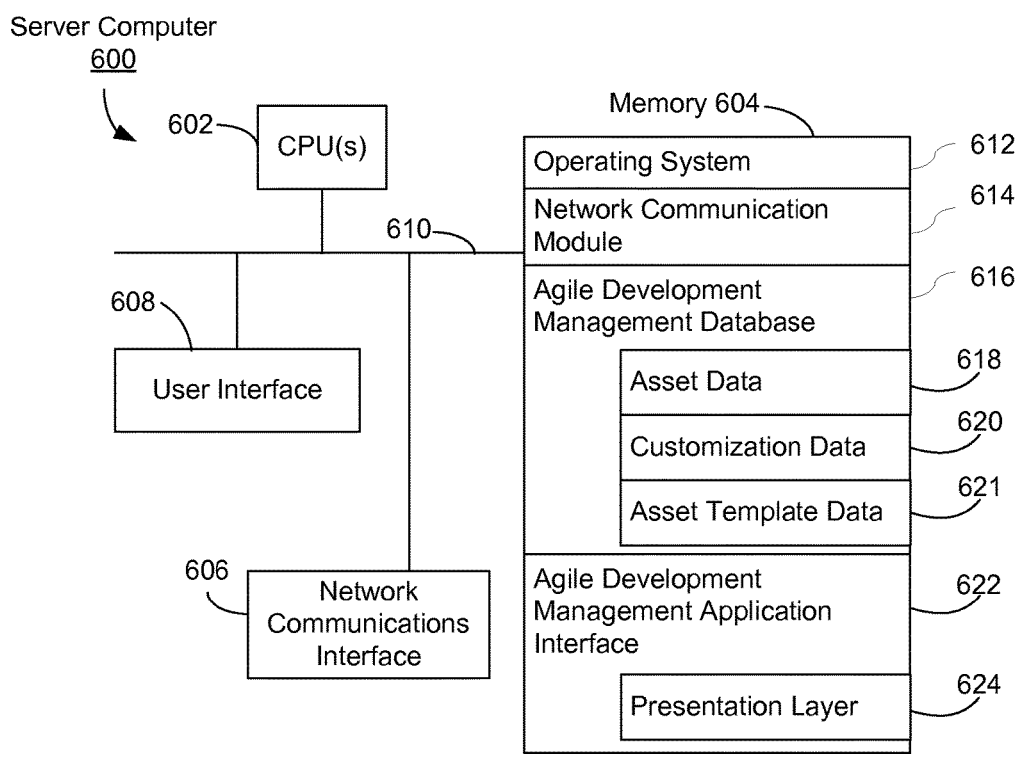
FIG. 6 is a block diagram illustrating a server computer in accordance with some embodiments.

FIG. 6 is a block diagram illustrating a server computer 600 in accordance with some embodiments. The server computer 600, which may be used as a server system 404 (FIG. 4), typically includes one or more processing units (CPUs) 602, one or more network or other communications interfaces 606, memory 604, and one or more communication buses 610 for interconnecting these components. The communication buses 610 may include circuitry (sometimes called a chipset) that interconnects and controls communications between system components. The server system 600 optionally may include a user interface 608, which may include a display device (not shown), and a keyboard and/or a mouse (not shown). Memory 604 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 604 may optionally include one or more storage devices remotely located from the CPU(s) 602. In some embodiments, memory 604 stores the following programs, modules and data structures, or a subset thereof:

- an operating system 612 that includes procedures for handling various basic system services and for performing hardware dependent tasks;
- a network communication module 614 that is used for connecting the server system 600 to other computers via the one or more communication network interfaces 606 and one or more communication networks, such as the Internet, other wide area networks, local area networks, metropolitan area networks, and so on;
- an agile development management database 616 for storing data relating to the agile development process, including asset data 618, customization data 620, and asset template data 621; and
- an agile development management application programming interface (API) 622 for exchanging information with the agile development management modules 520 in one or more client computers 500.

In some embodiments, the application interface 622 includes a presentation layer 624 for rendering user interfaces (e.g., FIGS. 2A-2K) accessed by a client system 402.

In some embodiments, the customization data 620 includes three levels of customization settings used by the presentation layer 624 to render user interfaces. A base level includes settings that are always included in the agile development management software. An installation level includes settings that are created for a particular installation of the agile development management software. For example, the installation level may include customization settings created via user interface 240. A user level includes personalized settings. Additional levels are possible, such as levels corresponding to a particular project hierarchy node (e.g., to a particular team). In some embodiments, settings at a given level override settings at lower levels. For example, installation settings override base settings, and user settings override both installation and base settings. In some embodiments, the presentation layer 624 first applies base-level settings, then overlays any installation-level overrides, and finally overlays any user-level overrides.

Each of the above identified elements in FIG. 6 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 604 may store a subset of the modules and data structures identified above. Furthermore, memory 604 may store additional modules and data structures not described above.

Although FIG. 6 shows a "server computer," FIG. 6 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers.

The agile development management database 616 stores data in various tables. For example, an "Asset Type" table includes an entry for each kind of asset, such as feature, defect, task, or test. An "Attribute Definition" table defines the attributes associated with each kind of asset listed in the "Asset Type" table. A "Synthetic Attribute" table references formulas used to calculate synthetic attributes. An "Attribute Security Check" table contains references to operations used to determine whether a user may access or modify particular attributes. For attributes that are associated assets, a "Relation Definition" table defines relationships between assets. In addition, a "Many to Many Relation Definition" table may contain relationship information for assets in many-to-many relationship with other assets. Other tables may specify business rules for various assets.

Attribute values for particular assets are stored in asset tables 700, as illustrated in FIG. 7A in accordance with some embodiments. In some embodiments, a table 700 corresponds to a particular kind of asset, such as feature, defect, task, or test. The asset table 700 includes a row 702 for each respective asset stored in the table. Each row includes fields that contain values for attributes of the respective asset, as defined in the "Attribute Definition" table. For example, the attribute fields include title 704, asset ID 706, project 708, owner 710, and various other attributes 720. Other possible attribute fields include, without limitation, the attributes listed in group 242 (FIG. 2B), such as status, priority, estimate, and attachment counts. The asset table 700 also includes fields 722 to specify attributes that are associated assets. For example, if a respective asset is a feature or defect, fields 722 may specify tasks and tests associated with the feature or defect, for example by providing the asset IDs of the tasks and tests. In another example, a field 722 may specify an iteration to which an asset is assigned.

In some embodiments, values for user-defined customized attributes are stored in separate tables for specific types of custom attributes. For example, numeric customized attributes are stored in a first table, text customized attributes are stored in a second table, boolean customized attributes are stored in a third table, and so on.

Customization data 620, such as the three levels of settings used by the presentation layer 624, also may be stored in tables in the database 616. FIG. 7B is a diagram illustrating a customization table 730 for customized settings in accordance with some embodiments. Each row 732 in the table 730 corresponds to a customized setting. Each row 732 includes a field 734 that specifies the type of asset group, such as work item planning, release planning, or iteration planning, to which the customized setting applies. Each row also includes a field 736 specifying the level of the customized setting, such as system default or personalized setting. In addition, each row includes fields corresponding to available attributes, such as title 738, asset ID 740, project 742, owner 744, and various other attributes 746. In some embodiments, a field corresponding to an available attribute includes a display flag 748 and an edit flag 750. The display flag 748 indicates whether the attribute is selected for display. The edit flag 750 indicates whether to display user input fields to permit editing of the attribute.

Tables 700 and 730 thus include information to allow the agile development management application interface 622 to respond to a request from a client computer 500 when a user seeks to display an asset group of a particular type. The interface 622 can query asset tables 700 to identify the assets in the group and can query the customization table 730 to determine which customized setting, if any, applies.

In some embodiments, attribute values for asset templates are stored in asset template tables 760, as illustrated in FIG. 7C in accordance with some embodiments. In some embodiments, a table 760 corresponds to a particular type of asset template (i.e., to templates for a particular type of asset). The asset template table 760 includes a row 762 for each respective asset template stored in the table. Each row includes fields that contain values for attributes of the respective asset template, as defined in the "Attribute Definition" table for the type of asset to which the template corresponds. Examples of attribute fields are described above with regard to FIG. 7A, and may include fields 722 for associated (i.e., related) assets.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of presenting and enabling editing of project management data for agile software development, comprising:
   at a computing device having one or more processors and memory,
   in a software development application:
      identifying a first plurality of assets associated with a software product being developed in the software development application in a first content display window;
      responsive to a selection of a first link corresponding to a first asset in the first plurality of assets:
         displaying concurrently in a second content display window separate and distinct from the first content window:
            a second plurality of assets associated with the first asset,
            attributes of the first asset, a second link corresponding to a second asset in the second plurality of assets, and
a third link corresponding to a third asset in the second plurality of assets;

detecting selection of the second link;

responsive to the selection of the second link:
- displaying in the second content display window attributes of the second asset configured to be editable by a user; and
- maintaining display of the second plurality of assets, attributes of the first asset, the second link, and the third link in the second content display window, including maintaining position and content of the second plurality of assets, attributes of the first asset, the second link, and the third link within the second content display window;

after detecting selection of the second link, detecting selection of the third link; and responsive to the selection of the third link:
- displaying in the second content display window, concurrently with the attributes of the second asset, attributes of the third asset configured to be editable by the user; and
- maintaining display of the second plurality of assets, attributes of the first asset, the second link, the third link, and the attributes of the second asset in the second content display window, including maintaining position and content of the second plurality of assets, attributes of the first asset, the second link, the third link, and the attributes of the second asset within the second content display window.

2. The method of claim 1, wherein the second content display window is displayed without causing any modification to the first content display window.

* * * * *